United States Patent [19]

Olson

[11] Patent Number: 4,783,028
[45] Date of Patent: Nov. 8, 1988

[54] DEVICES FOR APPLYING FREIGHT TRAIN AIR BRAKES ON DERAILMENT

[76] Inventor: Phillip W. Olson, 12900 W. 118th Ter., Overland Park, Kans. 66210

[21] Appl. No.: 104,247

[22] Filed: Oct. 5, 1987

[51] Int. Cl.$^4$ .............................................. B61L 3/00
[52] U.S. Cl. ...................................... 246/170; 246/173
[58] Field of Search ................ 246/170, 171, 172, 173

[56] References Cited

U.S. PATENT DOCUMENTS

| | | | |
|---|---|---|---|
| 1,463,679 | 7/1923 | De Leon | 246/170 |
| 1,700,019 | 1/1929 | Blankenship | 246/170 |
| 3,921,945 | 11/1975 | Swaim | 246/170 |

*Primary Examiner*—Robert B. Reeves
*Assistant Examiner*—Joseph D. Pape
*Attorney, Agent, or Firm*—Thomas M. Scofield

[57] ABSTRACT

Improvements in devices designed to actuate the air brakes of a freight car when a derailment occurs; a device which operates to immediately detect a wheel derailment of a railway train and automatically brings the air brake system of the train into a state of emergency stop; a fail open system and apparatus including an air relief valve attached to a railway car and also connected to the air brake pipe of the air brake system, sensor cylinder and spring assemblies connected to the railroad car body at one end thereof and at the other end to the side frame of a railroad car truck adjacent the railroad car wheels, an oil reservoir in the air relief valve which, when full, maintains the air relief valve closed and not venting air from the air brake pipe, a piston with an elongate piston rod associated with an oil reservoir in each sensor cylinder, the end of the piston rod being attached to the truck side frame, a line communicating between the oil reservoirs of the air relief valve and each sensor cylinder so that, when a wheel of the truck side frame derails and falls toward the roadbed, the piston rod in the sensor cylinder associated with that wheel draws oil from the air relief valve reservoir, thus opening the air relief valve to vent air from the air brake pipe and train line; a fall closed system and apparatus utilizing the same above listed elements in an opposite manner; a telemetry operated system utilizing air relief valves only on the last car of the train with radio signals transmitted from any derailed car actuating the rear car air relief valves.

28 Claims, 7 Drawing Sheets

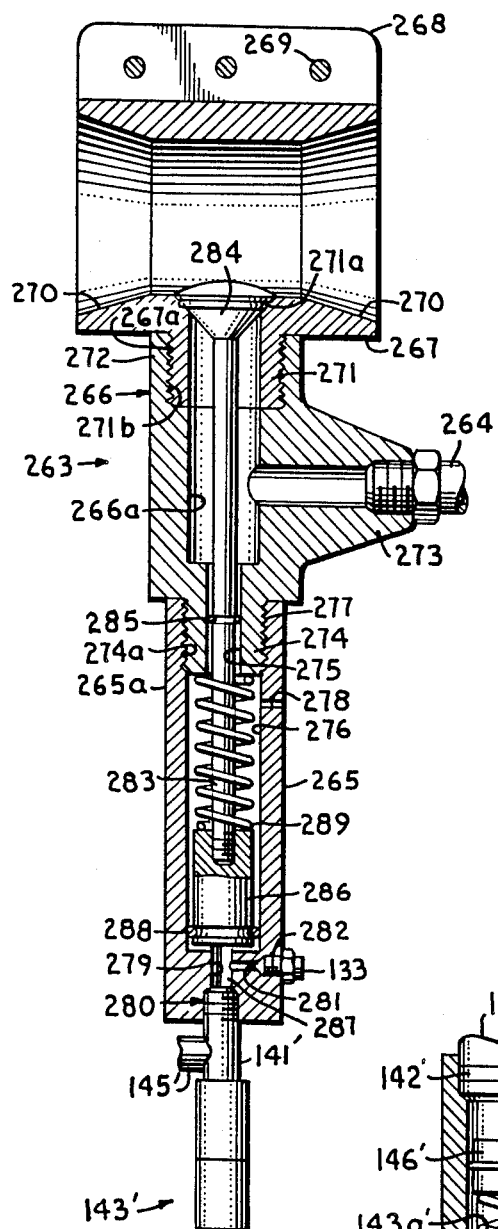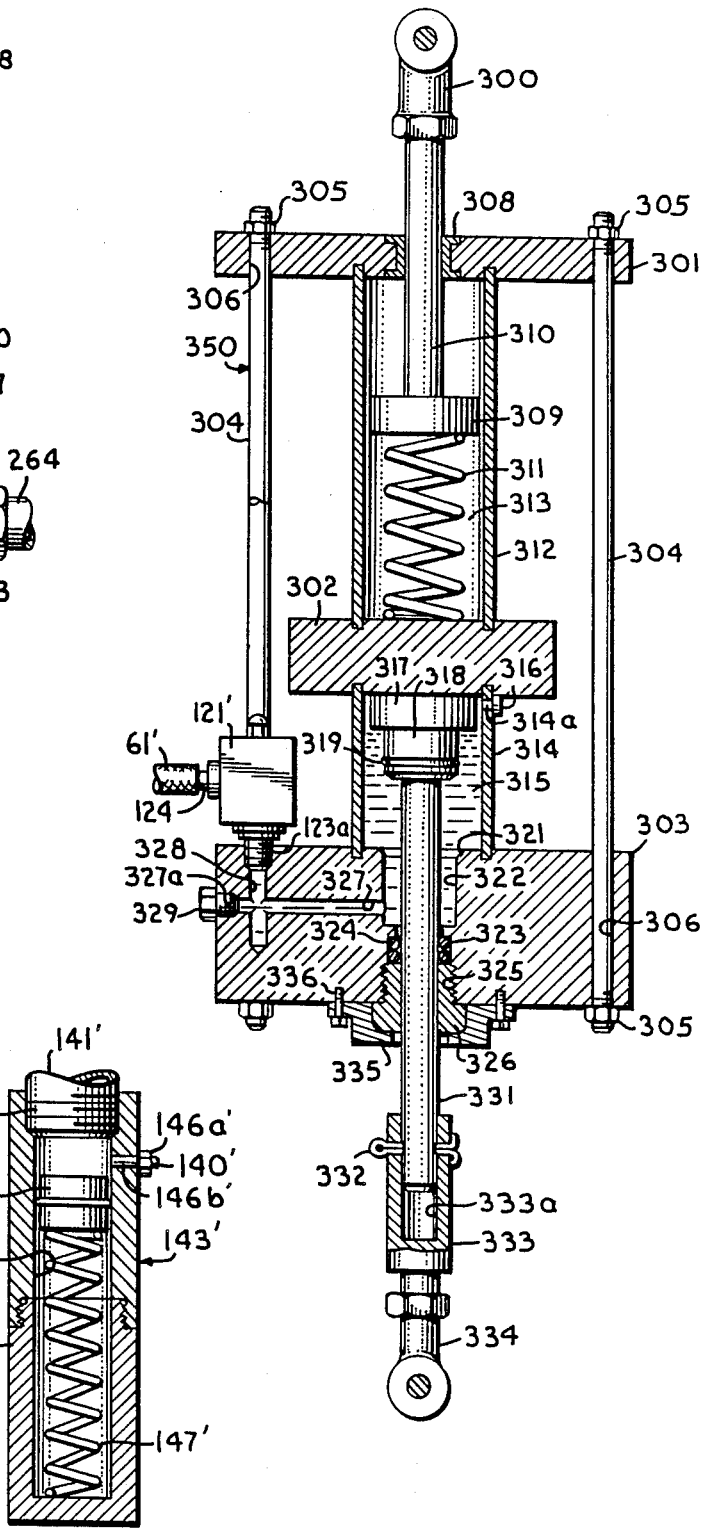

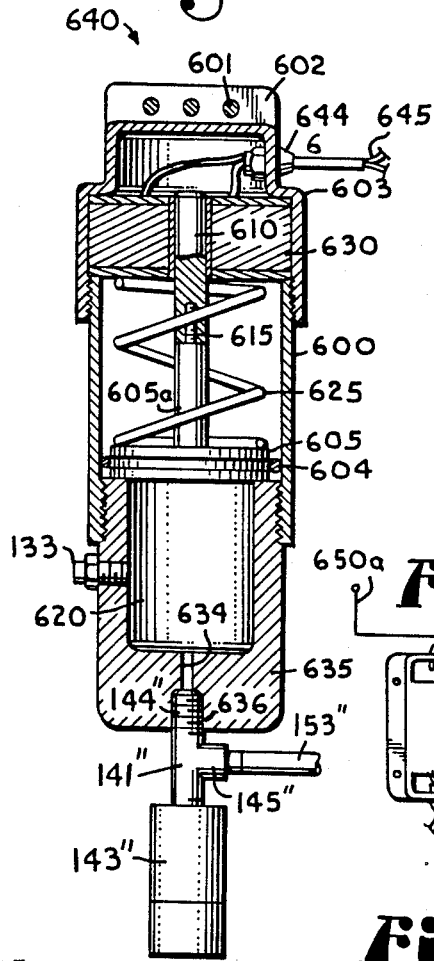

DEVICES FOR APPLYING FREIGHT TRAIN AIR BRAKES ON DERAILMENT

BACKGROUND OF THE INVENTION

The subject invention is directed to a device designed to actuate the air brakes of a freight car at the instant a derailment occurs. The primary purpose of the device is to minimize the damage which occurs as a result of a railroad derailment by reducing the number of cars which derail and the distance required to stop each car through immediate actuation of the brakes.

The problem is how to reduce the damage which occurs as a result of a freight train derailment. Derailment of a freight train can be devastating in its destructive power to property and lives, particularly if a tank car is involved which is carrying explosive, flammable or toxic materials. Class I Railroads reported the derailment of 26,890 cars in 1983 in which hazardous materials were involved with a total damage of $31,314,179 to equipment. This cost does not include the additional cost which resulted from loss of life, evacuation, property damage or litigation.

If method and apparatus could be found to quickly apply the air brakes on a derailed car, derailment costs such as those previously described could be reduced. The device described in this application is designed specifically for this purpose.

BRIEF DESCRIPTION OF THE INVENTION

The subject device is designed specifically to apply the air brakes in an emergency mode at the instant a car derails. An emergency mode is defined by the Association Of American Railroads (AAR) as an exhaustion of air pressure from the air brake line which will cause an immediate application of the air brakes. With respect to the subject apparatus and system, a derailment is defined to occur at the instant any wheel on the freight car leaves the rail and falls toward the ground.

The subject device or portions thereof is intended to be installed on freight cars with two trucks, each of which having two wheel sets, two side frames and a bolster. Two devices or systems will be required per freight car (one device per truck). An exploded view of one form of the device as it would be installed on a freight car, as well as a schematic flow diagram of one device, appears in the drawings of this application.

The following derailment hypotheses are the basis of analysis of work and operability of the subject system and device:

(1) That one wheel of the freight car will leave the track and drop toward the ground while the car body above the derailed wheel will remain for an instant in the same relative position as it was before the derailment occurred.

(2) That said one wheel drops before a second wheel either on the same axle or side frame follows.

(3) That the freight car wheels are normally in rolling contact with the rails unless a derailment occurs.

(4) That the offset distance between two rails at a bolted joint does not exceed 0.25 inches (reference: The Track Safety Standards published by the U.S. Department Of Transportation, Federal Railroad Administration, page 26).

(5) That "the vertical displacement of the over-the-road environment is limited to less than one inch while the vertical displacement of a derailed wheel is more than four inches". (Reference: The G-Sensing Derailment Detector by Paul Nance, FRA/ORD-80-75).

Restating somewhat, an emergency application is defined by the Association Of American Railroads as a very rapid exhausting of air pressure from the train brake line which will cause an immediate application of the air brakes. As the air from the brake line is exhausted, the brakes are applied at substantially the same time on every car from the derailed car to the end of the train. The brake line is pressurized by a compressor/air receiver located in the locomotive. If a break occurs in the middle of the train, the air in the train brake line is essentially exhausted evenly throughout the remainder of the train. The train brake line forward of the break would remain pressurized by the compressor/air receiver. Therefore, the brakes are applied on each car at nearly the same time from the derailed car to the end of the train.

The brake line is normally broken simultaneously with the overturning of the freight car. However, a freight car does not overturn immediately on derailment. Normally, the car is dragged for a substantial distance before it overturns. The subject invention is designed to open (break) the air line at the instant of derailment before the freight car has a chance to overturn; therefore, minimizing the damage caused by the derailment. This may be done at the first derailed car or starting at the rearmost car of the train as disclosed and described herebelow, In a variation of the subject device, when a wheel derails on a freight car in the train a radio signal is sent to a receiver at the next to the last car (last freight car) in the train and the brake air line is vented thereat.

SIGNIFICANCE OF DERAILMENTS

Derailments are a costly and detrimental problem of the railroad industry which, if significantly reduced, could provide a substantial monetary benefit to the railroad industry as a whole. The shipment of hazardous material by tank car is a particularly precarious dilemma for the railroad industry. On the one hand, hazardous material transportation represents a major source of revenue for the railroads; but on the other hand, a tank car derailment involving hazardous material can be an economic disaster and a public relations nightmare. The question must be: "How can this source of revenue be protected from the high cost of derailments involving hazardous materials?"

More than 30,000 materials have been designated hazardous in the Hazardous Material Transportation Act (HMTA) of 1975 (49 Code Of Federal Regulations (CFR) 171.8). These materials are classified as explosives, flammables, corrosives, combustibles, poisons, etc. and, because they are hazardous, there is an inherent risk in their transportation.

The U.S. Office of Technology Assessment estimates that 1.5 billion tons of hazardous materials are transported per year. The Environmental Protection Agency (EPA) estimates that 56 million metric tons of hazardous material wastes are produced per year with an annual increase of four to six percent. The Association of American Railroads (AAR), based on Train II data base for 1983, estimated that more than 15,000 car loads (73 million tons) of hazardous material, primarily chemicals, were transported and that tank cars, which constitute approximately 10% of the U.S. railroad car fleet, were the primary method of transportation. This tonnage is thought to have represented about five percent of the total hazardous material shipments by all modes of transportation. The AAR report stated that chemical traffic, of which 75% is considered hazardous, is increasing each year and has already increased 23% between 1975 and 1979. The report also estimated that shipments of hazardous materials will increase from 3,000 per day to 5,000 per day during the 1980's.

The main chemicals involved in rail transport incidents are sulfuric acid, phosphoric acid, anhydrous ammonia, hydrochloric acid, corrosive liquids and flammable liquids. These chemicals are vital to the economy of the United States and are shipped daily in large quantities. Since more tank cars will be carrying hazardous materials, the likelihood of some of these cars jumping the track increases.

OBJECTS OF THE INVENTION

The subject derailment reaction systems and devices have a low initial cost and are economically viable for installation on railroad freight cars with the return on the invested dollar within the same order of magnitude as the current return on original investment of the railroad industry.

Another object of the invention is to provide such systems and devices which have a very low false alarm rate, such within the same order of magnitude as the present occurrence of unwarranted emergency applications of the air brakes.

Another object of the invention is to provide such systems and devices which require only minimal maintenance consistent with the current maintenance practices for AAR freight cars.

Another object of the invention is to provide such systems and devices therefor which are self sufficient and capable of withstanding the operational environment of a freight car for at least 350,000 miles of service.

Yet another object of the invention is to provide such systems and devices therefor which are capable of monitoring multiple accidents caused by railroad equipment failures and roadway failures (i.e. broken rails, joints, switches or disrepair of the roadway).

Other and further objects of the invention will appear in the course of the following specification.

THE DRAWINGS

In the drawings, which form a part of the instant specification and are to be read in conjunction therewith, an embodiment of the invention is shown and, in the various views, like numerals are employed to indicate like parts.

FIG. 13 is a view like that of FIG. 3 but of a different air relief valve for a fail closed system.

FIG. 14 is a view like that of FIG. 4 but of a revised sensor cylinder and spring assembly for a fail closed system.

FIG. 15 is a view like that of FIG. 5 but of a revised sight glass.

FIG. 16 shows a sectional view through an electric pulse generator for use with the telemetry version of the subject invention.

FIG. 17 shows a radio frequency transmitter employed with the device of FIG. 16.

FIG. 18 illustrates an end of the train receiver and air relief valve employed with the devices of FIGS. 16 and 17 by a sectional view therethrough.

FIG. 19 is a schematic operational diagram of the transmitter system of FIG. 16 (on the left) and the receiver system of FIG. 18 (on the right).

FAIL OPEN SYSTEM AND APPARATUS FIGS. 1 AND 2

Figure 1:
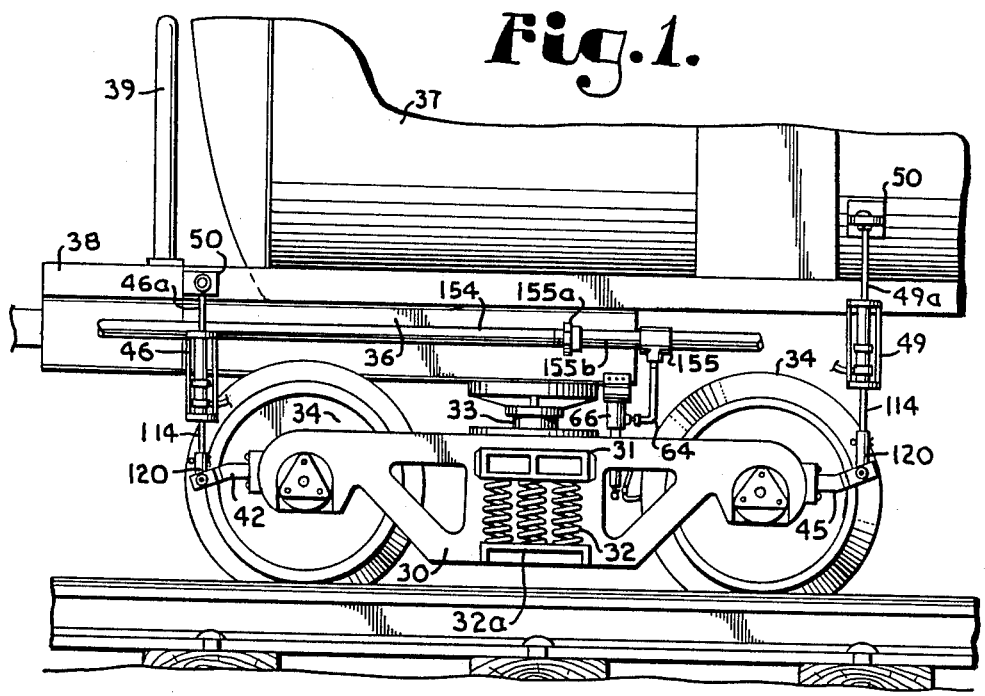
FIG. 1 is a side view of the front end portion of a railway tank car, showing a truck and sets of wheels thereat with parts of the subject system shown attached to parts of the tank car.
Figure 2:
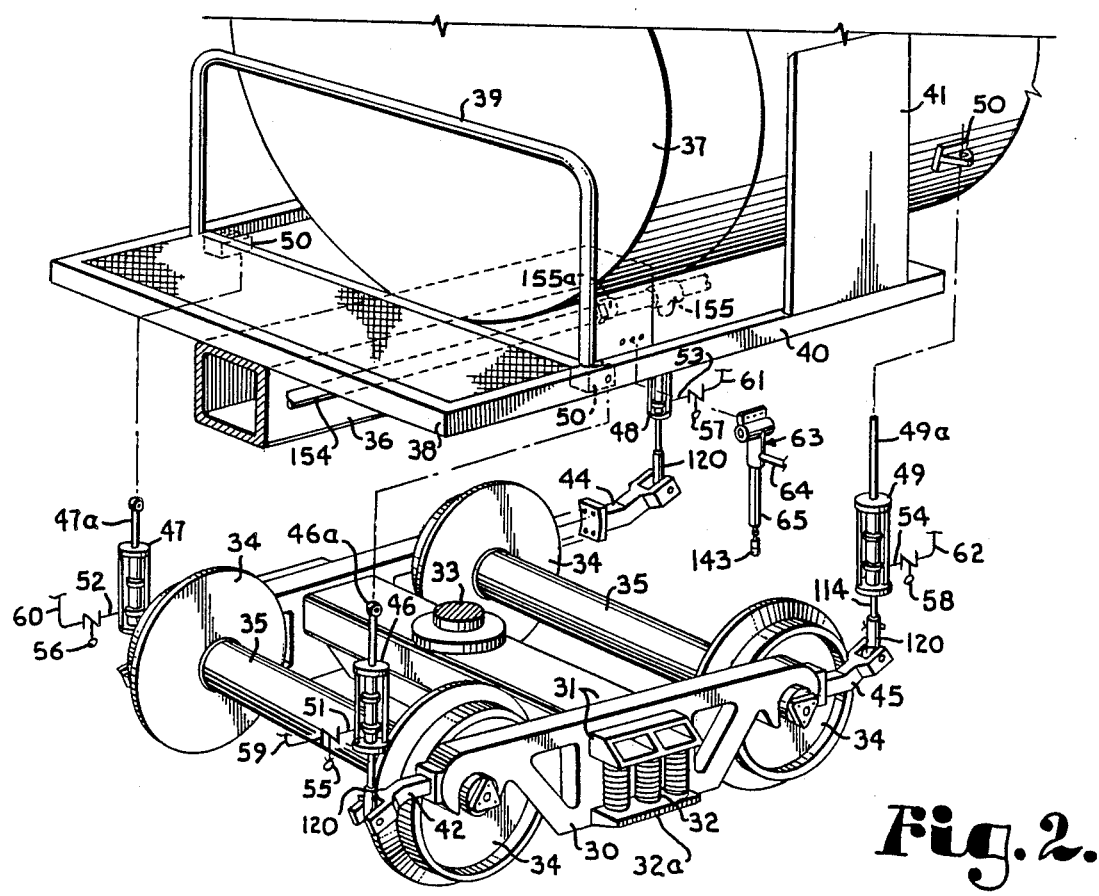
FIG. 2 is a three-quarter perspective view from above, exploded, of the front portion of the freight car seen in FIG. 1 showing the truck and wheel sets spaced downwardly from the tank car with the air relief valve and sensor cylinders and spring assemblies illustrated with respect to their mountings on the car and truck side frame.

Referring first to FIGS. 1 and 2, in the latter figure is shown an exploded view of the subject devices and system as applied and attached to the freight car body, wheel truck and brake air line. In the lower center of the view, there is seen a truck side frame 30 which is of conventional character, receiving bolster 31 and spring set 32 thereon. The latter (springs) are mounted on platform 32a fixed to the side frame 30. At 33 there is seen the freight car center pin. The wheels 34 are mounted in sets of two at opposite ends of the truck side frame 30 and are mounted on axles 35 in conventional manner.

Directly above the bolster and truck side frame there is seen base beam 36 which connects the two truck side frames 30 to the car. A tank or car body 37 is mounted on beam 36 and the other structurals of the car body, not shown. An end platform 38 with hand rail 39 is fixed over beam 36 and with respect to tank or car body 37, the structurals 40 extending rearwardly to receive side braces 41. Air brake line 154 runs along the length of the car on one side thereof connected to the car frame and, typically, reversing sides at the middle of the freight car. All of this description made so far is of completely conventional structure with only a minimum of such being described for orientation.

Brackets 42–45, inclusive are bolted or otherwise fixed to the end walls of the truck side frames 30. At 46–49, inclusive are shown four separate sensor cylinders and spring assemblies of a construction to be described in detail later. Each of these devices has an upper rod 46a–49a, inclusive adapted to be attached to brackets 50 which are attached to the car framing with respect to the front two sensor cylinders and spring assemblies (46, 47) and to the tank or other structural member of the freight car itself with respect to the rearmost pair of the sensor cylinders and spring assemblies (48, 49). Oil lines 51–54, inclusive pass from the sensor cylinders (as will be described in more detail later) to resettable check valves 55–58, inclusive. From thence lines 59–62, inclusive join and then go to the air relief valve which is schematically designated at 63 and will be described later in more detail. Air relief valve 63 has line connection 64 (consisting of nipples 64a, 64c, elbow 64b and union 64d) to the conventional brake air pressure line 154 at tee 155. While shown smaller in diameter for space reasons, line 64 has the same ID as like 154. There is one air relief valve for every four sensor cylinders and spring assemblies and two to a car having two four wheel sets of the character seen in this exploded view of FIG. 2.

FIG. 3 AIR RELIEF VALVE

Figure 3:
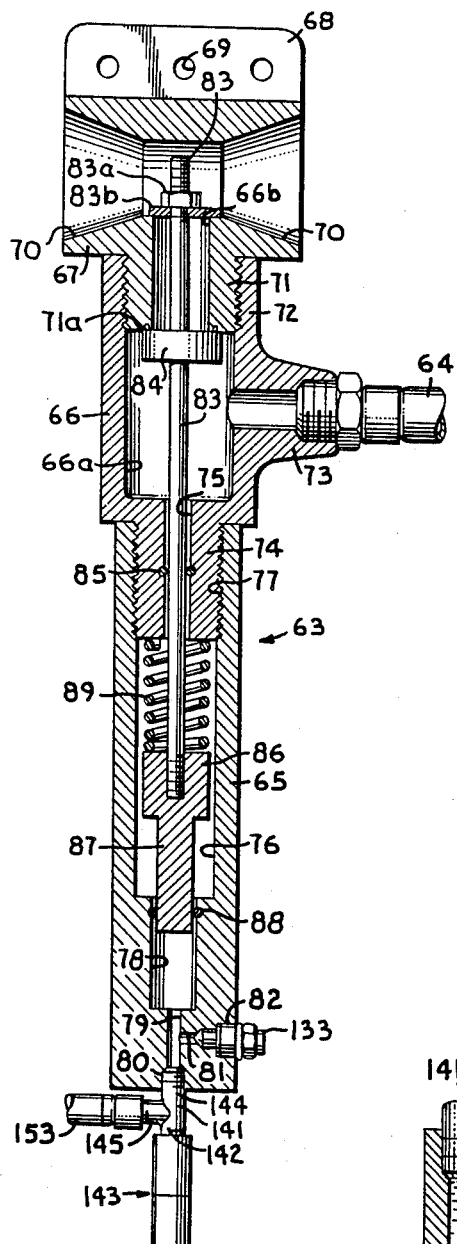
FIG. 3 is a side, cross sectional view through the air relief valve.

Referring to FIG. 3, therein is shown the air relief valve 63 first mentioned with respect to FIG. 1. Valve 63 has lower body portion 65, intermediate body portion 66 and upper body portion 67. Upper body portion 67 has attachment flange 68 thereon with openings 69 therein for fastening the air relief valve 63 to the frame of the freight car. Upper body portion 67 also has nozzle outlets 70 for air relief. Lower cylindrical end 71 of upper body portion 67 is threaded on the outer side thereof for engagement with the upper threaded portion 72 of intermediate body portion 66. The lower end of upper body portion 67 at 71a serves as an upper shelf or stop for a piston to be described. Intermediate body portion 66 additionally has side outlet 73 for connection to the freight car brake line 154 by a pipe or air line 64 as in FIG. 1. The lower, lesser diameter end 74 of intermediate body portion 66 is externally threaded for engagement with the upper end of lower body portion 65. A passage 75 exits through the lower end 74 of intermediate body portion 66.

Figure 9:
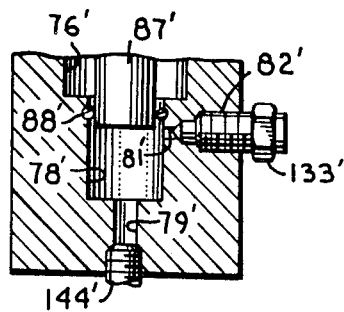
FIG. 9 is a fragmentary view of a revision of the structure in the lower part of FIG. 3.

Turning to the lower body portion 65, cavity 76 is formed throughout the middle and upper portions of body portion 65, the interior upper surface thereof internally threaded as at 77 to engage the externally threaded portion 74 of intermediate body portion 66. Oil chamber 78 is provided adjacent the lower end of portion 65 with lowermost passage 79 leading to an internally threaded fitting portion 80 to which connection is made to the sensor cylinders to be later shown and described. Second passage 81 has internally threaded portion 82 for connection of a bleeder valve 133 (to be described) thereat. An alternate and preferred position for bleeder valve 133 is seen in FIG. 9 wherein the lower end of lower body portion 65 is shown. Parts the same as in FIG. 3 are numbered the same, but primed.

An elongate shaft 83 has upper piston 84 thereon adapted to seal against suitable conventional seals at shelf 71a on upper body portion 67. Washer 83b and nut 83a are provided on the threaded upper end of shaft or rod 83 and will be removed before the air relief valve is placed into service after it is filled with oil. Shaft 83 is sealed by O ring 85 in passage 75. Threaded on the lower end of shaft 83 is plunger 86 which has a lower, lesser outer diameter extension 87 extending into oil chamber 78, and being sealed for reciprocation therewithin by suitable conventional seals or O ring 88. Spring 89 spring loads plunger 86 and shaft 83 in a downward direction in the view tending to unseat piston 84 from seat 71a and move plunger extension 87 into chamber 78 to expel the oil in chamber 78. It is the volume of oil in chamber 78 that maintains plunger 86, 87 in the position seen in the view against the spring load, thus also forcing piston 84 into air sealing contact with seat 71a. If the oil were to be exhausted from chamber 78, the plunger and shaft 83 would move rapidly downwardly in the view the depth of chamber 78, thus permitting air from the freight car brake line 154 to exhaust into lower chamber 66a via line 64 and then above piston 84 to the upper passageway 66b in upper body portion 67 and out the nozzles 70.

FIG. 4 SENSOR CYLINDER AND SPRING ASSEMBLY

Figure 4:
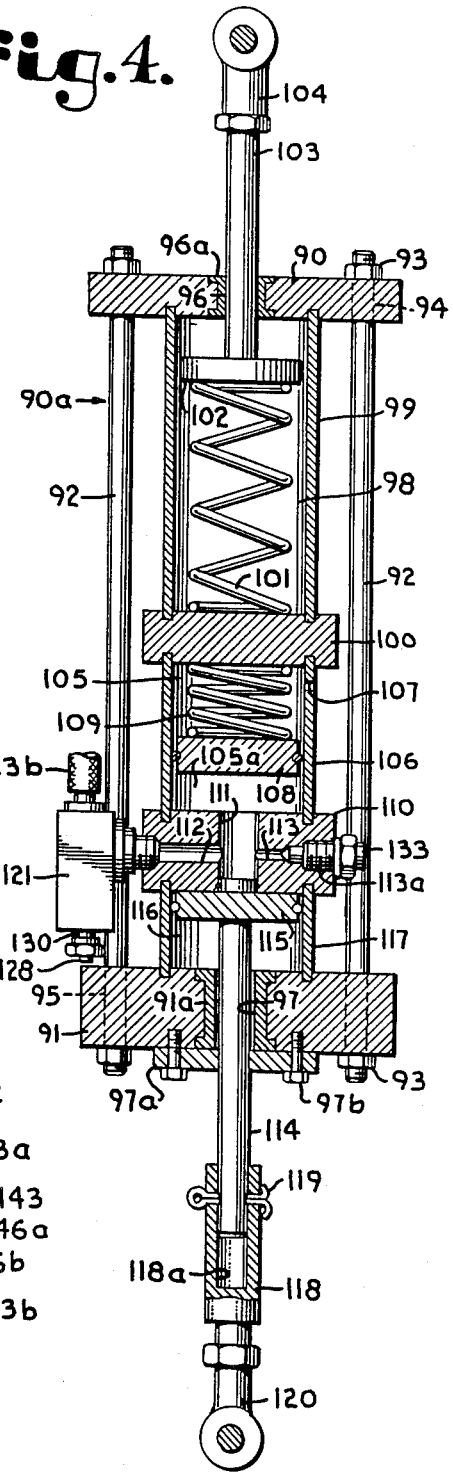
FIG. 4 is a side, cross sectional view through a sensor cylinder and spring assembly.

Now turning to FIG. 4, therein is shown one of the four sensor cylinder and spring assemblies 46–49, inclusive. Referring to this assembly, there is provided top wall 90 and bottom wall 91. Rods 92 serve to hold the entire assemblage together with externally threaded ends thereon with nuts 93 engaging same. Rods 92 pass through openings in upper and lower walls 90 and 91 as at 94 and 95. Walls 90 and 91 are typically circular in plan view. Upper wall 90 has bushing 96a defining opening 96 centrally therethrough. Lower wall 91 has bushing 91a defined central opening 97 therethrough. A centrally perforated plate 97a optionally may be fixed by bolts 97b to the lower face of wall 91 receiving rod 114 therethrough. through.

Upper chamber 98 is defined by cylindrical wall 99 which is fixedly received in the lower inward portion of top wall 90 and the upper side of first intermediate wall 100. Spring 101 bottoms on the top of intermediate wall 100 and abuts with its top end the circular plate 102 which is fixed to the lower end of rod 103. The upper end of rod 103 is a spherical bearing rod end 104 for attachment to a bracket 50 on the railroad car body.

Figure 10:
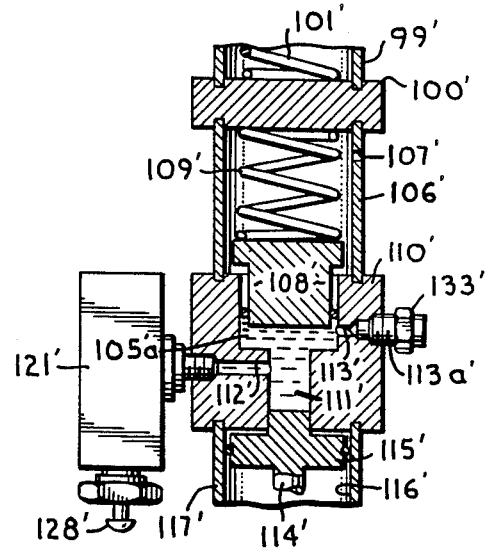
FIG. 10 is a fragmentary view of a revision of the structure in the lower center of FIG. 4.

Second chamber 105 is defined by cylindrical wall 106 having relief opening 107 in the upper part thereof. The lower portion of chamber 105 is an accumulator oil chamber 105a with sealing piston 108 on top of the oil body and under spring pressure from spring 109. Second intermediate wall 110 has passages 111, 112 and 113 therein. The end of passage 112 is internally threaded to receive a resettable check valve 121 (FIG. 6) to be described. The outer end of passage 113 is optionally internally threaded to receive a bleeder valve 133 (FIG. 7) to be described. Oil is received in all of the passages 111–113, inclusive, as well as in the lower portion of chamber 105a under piston 108. FIG. 10 shows a preferable arrangement of the parts just described. Like parts to those seen in FIG. 4 are numbered the same but primed.

Rod 114 extends through passage 97 and has piston 115 at the top end thereof. Lower chamber 116 is defined by cylindrical wall 117 within which piston 115 sealingly moves. The normal space in chamber 105a under piston 108 is quite exaggerated for purposes of illustration. The clearance of the piston 108 from wall 110 is typically no more than one quarter of an inch. The clearance of piston 115 from the top of wall 91 is typically two inches before the derailment action to be described. At the lower end of rod 114, clevis 118 engages at its upper end the lower end of rod 114 with cotterpin 119 passing through matching openings in rod 114 and clevis 118 chamber 118a below the lower end of rod 114 is typically three inches deep. The lower part of clevis 118 comprises spherical bearing rod end 120 for attachment to a railroad car truck as at 42-45, inclusive.

FIG. 6 RESETTABLE CHECK VALVE

Figure 6:
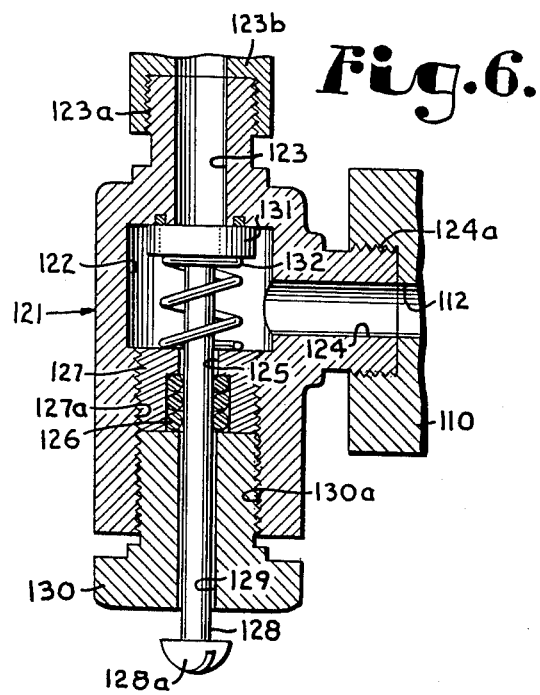
FIG. 6 is a side, cross sectional view through a resettable check value.

Referring to FIG. 6, therein is shown a resettable check valve, one of which is connected to each passage 112 of a sensor cylinder and spring assembly 46-49, inclusive. Such check valves are substantially shown and numbered 55-58, inclusive in FIG. 2. The resettable check valve has main body 121 in which there are provided chamber 122, first passage 123, second passage 124 and third passage 125, 126 in bushing 127. Bushing 127 is threaded into internally threaded passage 127a. The externally threaded collar portion 123a is to be connected by an oil line 123b or 59, 60, 61 or 62, see FIG. 2) to the air relief valve 63 at connection 80 thereof. Such oil lines are numbered 59-62 in FIG. 2. The externally threaded portion 124a is to be threaded into the sensor cylinder wall 110 in the internally threaded outer end of passage 112. Passage portion 126 contains O rings or conventional packing to seal around rod 128 which extends up through passage 129 in lower nut 130 which is threaded into passage portion 130a. Cap 128a threads on rod 128. Rod 128 has piston 131 at the upper end thereof which seats against the lower shelf end of the wall surrounding passage 123 in sealing fashion. Spring 132 tends to keep piston 131 against the top wall of oil chamber 122 in the resettable check valve.

FIG. 7 BLEEDER VALVE

Figure 7:
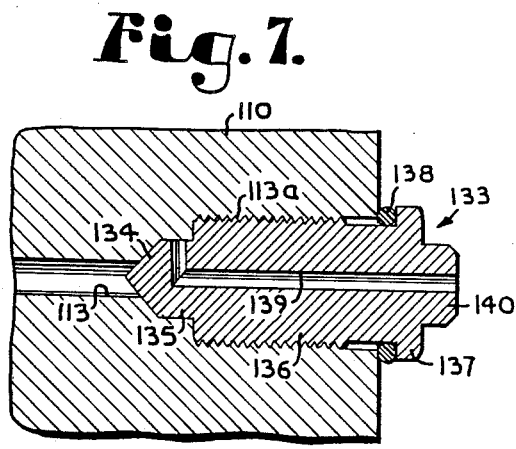
FIG. 7 is a side, cross sectional view through one of the bleeder valves.

Referring to FIG. 7, therein is shown a bleeder valve generally designated 133, one of which is used on each sensor cylinder to engage the outer internally threaded end of passageway 113 in wall 110 and one of which is also employed per air relief valve 63 to engage passageway 82 therein. It will be assumed that the bleeder valve 33 shown is installed in lower intermediate wall section 110 (FIG. 4) whereby passageway 113 (FIG. 4) is to receive the valve in the enlarged internally threaded outer portion 113a thereof. Valve 133 has conical front end 134, cylindrical lesser diameter portion 135, greater diameter externally threaded portion 136 and external flange portion 137, the latter of which seals by O rings or other conventional means 138 against the outer wall of wall member 110. A channel or passageway 139 runs the substantial length of the valve body from outer end (nut) portion 140 to opposite lesser diameter portion 135 where the passage exits from the valve body. Slightly unscrewing valve 133 by engaging nut 140 allows air in passage 113 to exhaust through passage 139.

FIG. 5 SIGHT GLASS

Figure 5:
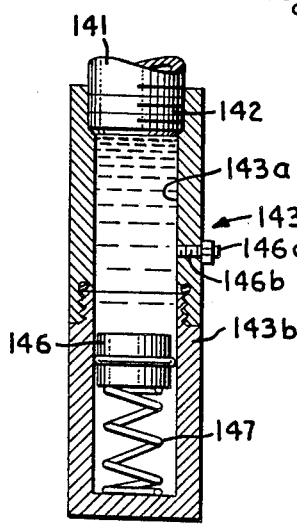
FIG. 5 is a side, cross sectional view through the sight glass.

Reference is now made to FIG. 5 wherein is shown a sight glass 143 with plug 146a. Tee 141 (FIGS. 3 and 8) is connected at one end 142 to sight glass 143. The upper arm 144 of the tee is connected to the air relief valve 63 at zone 80, while the other connection 145 of the tee, as will be described, is made to the common line 153 joined by the lines 59-62 inclusive from the sensor cylinders and spring assemblies in a manner to be described.

The upper portion of sight glass 143 at 143a is a clear plexiglass tube. The bottom portion is opaque at 143b and therebelow. A spring loaded plug or piston 146, backed up by spring 147, is provided in the internal chamber of the sight glass. If the plug or piston 146 is visible, then the device or system is low on oil and the air relief valve 63 could be (improperly) cracked open allowing air to vent from the brake line, possibly causing the freight car to brake.

FIG. 8 SCHEMATIC

Figure 8:
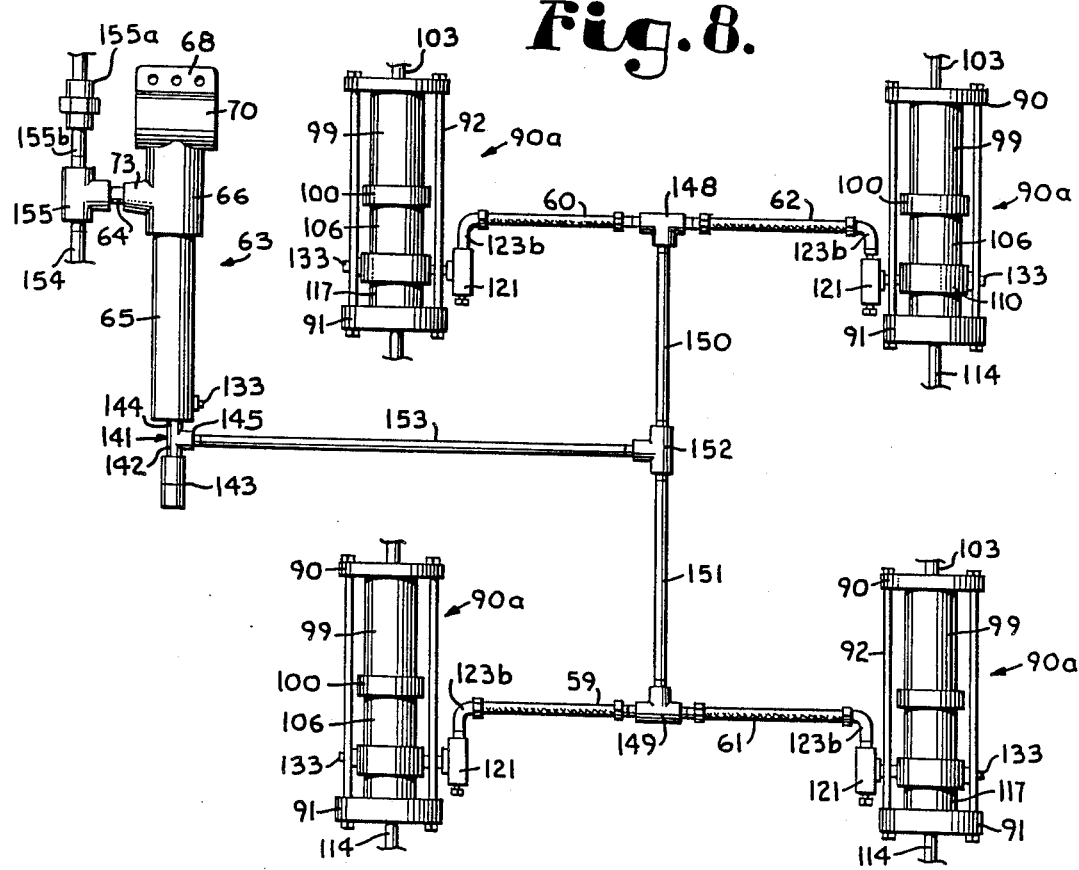
FIG. 8 is a schematic showing of four sensor cylinder and spring assembly units as employed in FIG. 2 showing how they are coupled with an air relief valve, the resettable check valves and the bleeder valves, as well as the sight glass.

Referring to FIG. 8, therein is shown a schematic representation of the array of devices attached to one truck of the freight car as in FIGS. 1 and 2. One assemblage is required per truck and two assemblages are required per freight car. The sensor cylinder and spring assembly devices are numbered 90a for recognition, the air relief valve is numbered 63, the resettable check valves 121, the bleeder valves 133 and the sight glass 143.

Thus it can be seen that there are four sensor cylinder and spring assemblies 90a. They are attached to the railroad car body by upper rods 103 (FIGS. 1, 2 and 46a-4a, inclusive) and to the railroad car truck by rod ends 104. Each sensor cylinder and spring assembly 90a has a bleed valve 133 attached thereto via passage 113. Each pair of sensor cylinder and spring assemblies are attached by lines 59-62, inclusive to respective tees 148 and 149 from which lines 150 and 151 lead to tee 152. Line 153 leads from tee 152 to connection 145 of the tee 141 at the air relief valve 63. Lines 59-62, inclusive are typically flexible metallic braided hoses.

The air relief valve is connected to the freight car brake line 154 by tee 155 and union 155a on nipple 155b which is engaged by pipe 64 which leads into connection 73 of the air relief valve 63.

OPERATION

The hydraulic cylinder/spring assemblies (90a or 46-49, inclusive) are designed to open the air relief valve 63 at the instant any one or more of the freight car wheels derail. These assemblies function as constant monitors of the position of the car body relative to the truck. Each assembly consists of one hydraulic cylinder 117 with chamber 116; one accumulator cylinder 106 with chamber 105a; cylinder 99; two springs 101 and 109, two rods 103 and 114 carrying pistons 102 and 115, two rod ends 104 and 120, one cotter pin 119, piston 108, one check valve (121 or 55-58 inclusive) and support brackets 42-45, inclusive and 50. The upper spring 101 is designed to compensate for the vertical displacement of the freight car during loading and as the car rolls on the track. That is, a the freight car is loaded or unloaded with cargo, the upper spring 101 adjusts from pressure by piston 102 proportionally to the loading on the car. Spring sets 32 carry the car and car loading, compressing as the load increases and relaxing as it decreases. Spring 101 must be able to compress 5½ inches, which is the height springs 32 can compress. In addition, upper spring 101 adjusts to the bouncing vibration motion of the freight car as it rolls on the track.

The cylinder 117 with chamber 116 is designated as a sensor cylinder and the volume of oil above piston 115 remains unchanged, as shown in FIG. 4, unless a derailment occurs. During a derailment, the piston 115 in the sensor cylinder 117 instantaneously is pulled down, thus increasing the volume above piston 115 in the sensor cylinder chamber 116. This rapid drawing of oil from chambers 105a and 111, as well as passages 113, 112 and 124 and 122 in resettable check valve 121 (FIG. 6), causes formation of a vacuum in these areas. Oil from chamber 78 in air relief valve 63 to which cylinder chamber 116 is connected through passages 111, 112, etc., tries to replace the oil drawn from these areas. This displacement of oil from chamber 78 through lines 79, 81, 80, 141, 143a, 145 and 153 causes air relief valve 63 to open at piston 84 under the impetus of spring 89 and vent the brake line 154 through line 64, therefore actuating emergency braking of the derailed freight car and adjacent downstream cars.

As a starting point, one assumes that the lines and devices previously described are full of oil. This means that each of the cylinder chambers 111 and accumulator chambers 105a are filled with oil as seen in FIG. 4, also that the lines 112 leading from the sensor cylinder to resettable check valves 121 are full of oil, as is the resettable check valves 121 (lines 124, chambers 122 and line 123) shown in FIG. 6. Bleeder valves 133 are positioned as previously described and the lines 81 (FIG. 3), and 113 (FIG. 4) to them are full of oil. Lines 59-62, inclusive, lines 150 and 151, tees 148, 149 and 152, line 153 and tee 145 are also full of oil and free of air. The sight glass 143 is filled with oil so as to depress piston 146 therein. The lower chamber 78 (FIG. 3) of the air relief valve 63 and line 79 are filled with oil. Piston 115 is closed upwardly as seen in FIG. 4 and piston 84 (FIG. 3) is seated on shelf 71a with the lower piston portion 87 of plunger 86 held upwardly as seen in FIG. 3 by the oil in chamber 78 against spring 89. Nut 83a and washer 83b on shaft 83 in FIG. 3 have been removed. All the resettable check valves 121 have pistons 131 seated in the manner seen in FIG. 6.

The resettable check valves are designed to prevent oil drawn into chamber 116 of sensor cylinder 117 from flowing backwards into air relief valve 63 and the hydraulic tubing (153, 150, 151 and 59-62 inclusive) associated therewith during normal operations and derailment.

During normal operation, as the freight car rolls on the track, it encounters bolted rail joints which have a maximum of one quarter (0.25) inch drop per Federal Railroad Administration (F.R.A.) regulation. At these joints, each wheel 34 may drop 0.25 inches as it rolls over the rail joint. As the wheel(s) drop(s), the end of the truck 30 supported by the wheel(s) 34 also drops. The piston 115 in the sensor cylinder chamber 116, which is attached to the truck 30 will also drop 0.25 inches. This drop by piston 115 could cause an undesired opening of air relief valve piston 84 and emergency application of the freight car brakes. In order to prevent with an accumulator chamber 105a under piston 108. The accumulator chamber 105a acts as a reservoir of fluid against which the piston 115 can draw oil as it drops. During normal operation the accumulator chamber 105a is filled with oil, but as the sensor cylinder piston 115 drops, the accumulator piston 108 also drops under impetus of spring 109. At the instant the freight car wheel 34 contacts the lower rail after the drop, the sensor cylinder piston 115 and accumulator piston 108 return to their normal operating positions as seen in FIG. 4.

Therefore, the sensor cylinder chamber 116 and accumulator chamber 105a combination continuously acts to absorb the normal drops which occur as the freight car rolls on the track, without triggering piston 84 of the air relief valve 63 falsely.

The operations and purposes of the air relief valve 63, sensor cylinder piston 115, resettable check valves 121 and cotterpin 119 on derailment may now be described. The subject device is designed to react to freight car derailment by opening the air relief valve 63 at piston 84 to exhaust the air brake line 154, 64 of the freight car.

The subject device is designed on the premise that the freight car body remains for an instant at the same distance above the rail as it was before the derailment. During this instant, the derailed wheel 34 and the end of the truck 30 instantaneously drops at least four inches as referenced in G-Sensing Derailment Detector by Paul Nance FRA/ORD-80/75. During a derailment, at least one sensor cylinder piston 115, which is attached to a bracket as at 42-45, inclusive by rod 114 to the truck side frame 30 will drop two inches and bottom out on the top of sensor cylinder lower wall 91. Further fall of the wheel 34 is taken up in expansion of spring 101. Oil from the air relief valve chamber 78 (driven by spring 89) and sight glass 143 (driven by spring 147) moves through lines 79 and 80, tee portions 142, 144 and 145 and line 153 to either line 150 or 151. Thence such will be also drawn via, say, lines 151 and 59 and valve 121 into the sensor cylinder chamber 116 by piston 115 as it drops. In air relief valve 63 downwards motion of plunger 86, 87 and rod 83 cause the upper air relief valve to open by pulling piston 84 downwardly from seat 71a. The oil which has now been drawn into the sensor cylinder chamber 116 will not be able to flow backwards into air relief valve 63 because of the action of spring 132 on piston 131 in the resettable check valve 121. Accumulator chamber 105a contains only one-eighth of the volume of oil drawn into sensor cylinder 116 from chamber 78 of air relief valve 63.

The wheel 34 with the truck side frame 30 continues to fall until the wheel hits the (roadbed) ground. On impact, wheel 34 and truck side frame 30 will rebound toward the freight car body which, at this juncture, will now probably be falling. This action reverses the direction that the sensor cylinder piston 115 has moved and causes the piston 115 to push oil into chamber 105a until spring 109 compresses solid and then to continue to try to push the excess oil in sensor cylinder chamber 116 above piston 115 back into the air relief valve 63. The resettable check valve 121 (piston 131 seated as in FIG. 6) prevents this and, therefore, the air relief valve 63 remains open driven by spring 89 until manually reset.

The total length of the sensor cylinder and spring assembly 90a from 104 to 120 is now two inches longer than it was before the derailment because of the excess oil in the cylinder chamber 116 drawn from chamber 78 through the lines noted. When the wheel hits the ground, a yo yo effect will probably result because of wheel rebound and the probable falling of the car body. Impacts and reactions may create a type of yo-yo behavior that ends with the car body catching up with wheel 34, as it was before the derailment occurred.

By this time the mechanism described (system) has been fully tripped and pipe 154 is being vented and the freight car brakes will soon be applied through an emergency actuation mode.

Cotter pin 119 is sheared at the instant the wheel 34 impacts the roadbed by the force of piston 115 trying to push the excess oil out of sensor cylinder 116. The cotter pin 119 is the weakest link in the linkage and is sized to withstand only a fraction of this impact loading. The impact loading will also cause spring 109 to be compressed back to its solid, undeflected position as shown in FIG. 4. Cotter pin 119 shears on impact, allowing the sensor cylinder spring assembly 90a to return to its original length (through rod 114 lower end moving down into 3 inch long cavity 118a), but with the excess oil still contained in the sensor cylinder chamber 116 and the air relief valve 63 open at 84 allowing air to exhaust from the brake line 154. The combined volume of chambers 78 and 105a defined under pistons 87 and 108 respectively must be less than the total volume of chamber 116 after piston 115 has moved from its FIG. 4 position to its lowermost position bottoming out on the upper face of wall 91.

Restating, the original length of 90a is from the centerline of opening in 104 to centerline of opening in 120. On derailment piston 115 will bottom out on the wall 91 top face. When wheel 34 hits the ground, piston 115 will try to push oil out of chamber 116 thereabout but cannot because of check valve 121. Thus cotter pin 119 shears, allowing end of rod 114 to slide down into space 118a while connection 120 and clevis 118 are pushed up by the wheel 34 impact with the roadbed and the truck sideframe following the latter. Chamber 116 may be of 2 to 4 inches depth, but must be sufficient to exhaust chamber 78 and the interconnecting lines as previously described.

INSTALLATION PROCEDURE

The following are the steps in application of the subject device and system to a freight car body. This is the installation of one complete device (four leveler spring/sensor cylinder assemblies and one air relief valve) with respect to one truck of four wheels at one end of the freight car. The same procedure would be followed for each truck of each freight car to be fitted with the device and system.

(1) Install four brackets 50 on the freight car body and four brackets 42–45, inclusive on the truck side frame at each wheel location on the truck.

(2) Install one leveler spring/sensor cylinder assembly (already equipped with a resettable check valve and a bleeder valve) between each pair of brackets already installed. Four assemblies are required per truck. (see FIG. 2)

(3) Cut the brake line 154 of the freight car in two places and externally thread the opposed ends of the cut line. The cuts should be approximately 12 inches apart in the brake line near the center of the truck at a convenient, accessible location. Next, drill and tap three holes on a vertical member of the freight car underframe adjacent to the cut in the brake line. Install the air relief valve 63 secured by bolts through flange 68 onto the underframe of the freight car. Install a pipe tee 155 on the brake line 154. Install two pipe nipples 64a and 64c, one elbow 64b and union 64d between the pipe tee 155 in the brake line 154 and the air relief valve 63. Install one pipe nipple 155b and one union 155a (FIG. 12) between the pipe tee and the second cut in the brake line. All pipe joints must be air tight.

(4) Install a pipe tee 141 on air relief valve 63 and attach sight glass 143. Install a tube section 153 extending from tee 141 on air relief valve 63 and install tee 152 at the free end thereof. Install two pieces of tubing 150 and 151 attached to the underframe of the freight car and reaching outwardly to each sideframe on the truck. Install one pipe tee (148 and 149) at the truck side frame end of each of tubes 150 and 151. Install four metallic braided hoses 59–62, inclusive between tees 148 and 149 and the resettable check valve 121 at each of the four spring/cylinder assemblies. Attach eight clips to the freight car where possible to secure the tubing. All pipe joints should be air and oil tight.

OIL FILLING OF THE SYSTEM

Assume nut 83a and washer 83b have not been removed from shaft 83 in FIG. 3.

With the system installed as previously described, next, the entire system must be filled with an incompressible fluid, such as oil. First, there is attached a pump (an oil pump) to the bleeder valve 133 (see FIG. 7) on air relief valve 63. A second bleeder valve is opened on one of the sensor cylinders such as that seen in the lower right hand corner of FIG. 8 at 133. The plunger 128 (FIG. 6) of the resettable check valve 121 of this sensor cylinder is pulled down and held down by suitable grip means. Next, the plug 146a is removed from the sight glass 143 in FIG. 5. Oil is then pumped into the air relief valve (FIG. 3) into chamber 78, lines 81 and 79, as well as into sight glass 143. When oil comes out of port 146b in the sight glass 143, then plug 146a will be threaded closed. . . . This oil also enters line 153 (FIG. 8), passing to tee 152. Any displacement of air from any of these positions is relieved out the bleeder valve 133 in the lower right hand corner of FIG. 8 and plug port 146b in FIG. 5 while the latter is open. The oil then passes into lines 151 and 61 and fitting 123b on the resettable check valve 121 (FIG. 6) at the said spring assembly and cylinder 90a. This oil then fills chamber 122 and line 124 (FIG. 6) of the check valve 121 and then passes into line 112, line 113 and chambers 111 and 105a up to the top of passage 113 as shown in FIG. 10. When the oil passes into line 113 and begins to bleed around point 134 of bleeder valve 133 into line 139 thereof (FIG. 7), the first part of the system is filled. Piston 131 in valve 121 is then released so spring 132 will close it.

The procedure just described is then repeated individually for each cylinder and spring assembly of the array or four such shown in FIG. 8. Thus, if the first system has been filled as described and the bleeder valve 133 on the first cylinder and spring assembly closed, then, the cylinder and spring assembly in the lower left hand portion of FIG. 8 may next be filled. Its bleeder valve 133 has the central plug 136 thereof (FIG. 7) unthreaded until plug portions 134 and 135 clear the walls against which they abut and permit oil flow from passage 113 into passage 139 in the threaded plug 136.

Oil having already filled line 153, tee 152, line 151, line 61, etc., further oil pumped into the bleed valve 133 on air relief valve 63 will fill line 59, as soon as the plunger 128 (FIG. 6) is pulled down and secured down on the resettable check valve 121 on the lower left hand cylinder and spring assembly of FIG. 8. Thereafter, there is further oil flow into fitting 123b, the open chamber 122 and lines 124, 123 of the resettable check valve 121 and thence into the lines 112, 111 up to the top of passage 113 of this second cylinder and spring assembly. When the flow comes through line 113 and out line 139 of the bleeder valve 133, the latter is again threaded shut for the second cylinder and spring assembly. In this manner, each of the cylinder and spring assemblies of the array of force seen in FIG. 8 are filled, as well as the lines 150, 60 and 62 thereof and the parts to which such lines are connected. At this point, the bleeder valve 133 is restored to air relief valve 63 and tightened up or sealed. Successively, the plunger 128 of each resettable check valve is released and returned to closed position as seen in FIG. 6 from the oil fillup of the spaces, lines and chambers mentioned in respect to the initial and second fillups above.

After a derailment, this process is again used to balance the system and replenish oil as needed. If any of the elements of the system are damaged or destroyed, such must be replaced and the entire system again oil filled as destruction of any of the sealed systems will drain all of the oil out of the system array as seen in FIG. 8. On the other hand, if no destruction takes place and no oil loss, with just a wheel having come off the rail, the restoration of the derailed wheel or wheels to the track should restore one or more pistons 115 to the position seen in FIG. 4. However, to do this, either the resettable check valve rods and pistons 128 and 131 must be opened and/or the bleed valves 133 on each cylinder and spring assembly. In any case, the system must be restored to intact condition and the oil in the lines and chambers of the system be restored to the condition seen in the drawings: FIG. 3, FIG. 4, FIG. 6 and FIG. 7 as well as the lines seen in FIG. 8.

The system described to this point in this application has been designated as the Fail Open System, because if oil is lost from anyone of the described components or interconnecting pipe, the Air Relief Valve (FIG. 3) will open allowing the brake line 154 to vent.

FAIL CLOSED SYSTEM AND APPARATUS FIG. 14

Figure 11:
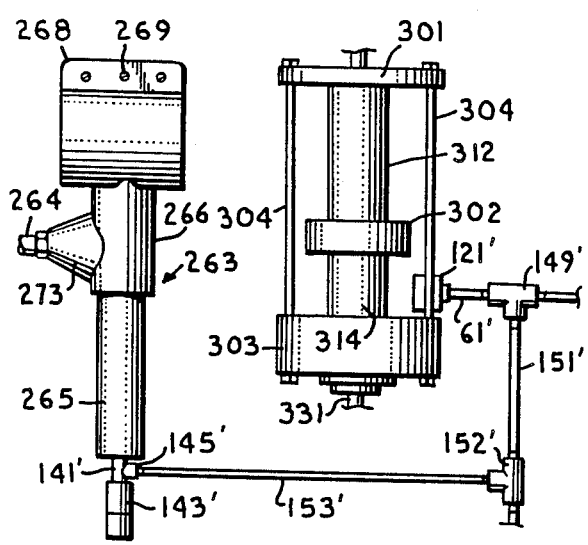
FIG. 11 is a fragmentary view of a revision of the upper right corner of FIG. 8 employed with the devices of FIGS. 13 and 14 and the fail closed system.

Turning to FIG. 14, therein is shown a second form of one of the four sensor cylinder and spring assemblies used in the positions as seen in FIG. 2 at 46-49, inclusive. (Also at positions 90a (4) in a revision of FIG. 8 for the fail closed system, see also FIG. 11.) In this view, save for the reoriented valve 121, all of the parts of the structure which is closely analogous to the sensor cylinder and spring assembly seen in FIG. 4 are renumbered starting at 300.

In this assembly, there is provided a top wall 301 and a bottom wall 303. Elongate rods 304, externally threaded on their ends, serve to hold the entire assemblage (to be described) together with nuts 305 engaging said externally threaded end portions. Rods 304 pass through openings 306 in lower wall 303 and upper wall 301, respectively. Walls 301 and 303 are typically circular in plan view.

Upper wall 301 has bushing 308 defining opening 308a centrally therethrough. Lower wall 303 has gland 326 threaded into the central opening 325 in the underside of wall 303. A centrally perforated plate 335 may optionally be fixed by bolts 336 to the lower face of wall 303 receiving elongate rod 331 to pass therethrough.

Upper chamber 313 is defined by cylindrical, normally vertical side wall 312 which is fixedly received in the lower, inward portion of wall 301, as well as in the upper side of intermediate wall 302. Spring 311 bottoms on top of intermediate wall 302 and abuts, with its top end, the circular plate or piston 309, itself fixed to an elongate rod 310 at the lower end thereof. The upper end of rod 310, which extends through bushing 308, comprises a spherical bearing rod end 300 adapted for attachment to a bracket 50 on the railroad car body.

Second, lower chamber 315 is defined by normally vertical cylindrical wall 314 having internally threaded opening 314a at the upper portion of the side cylindrical wall 314 near the latter's juncture with the underside of intermediate wall 302. Opening 314a is threadably engaged, in leak proof fashion, by externally threaded plug 316. The lower end of side wall cylinder 314 is fixed into the upper surface of lower wall 303.

Figure 12:
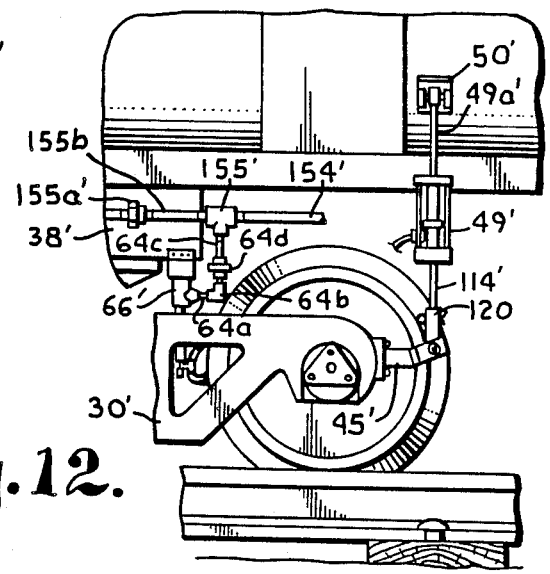
FIG. 12 is a fragmentary view of a revision of the right hand side of FIG. 1.

Lower wall 303 contains, to the left of centrally thereof, connecting passageways 327 and 328. The left hand end of passage 327 in FIG. 12 is provided with internal threading 327a which threadably engages plug 329. The upper end of passage 328 is internally threaded to receive the externally threaded portion 123a of the resettable check valve 121 seen in FIG. 6.

Returning to the center of lowest wall 303, lower center, chamber 323 contains 0 rings 324 for sealing of reciprocating motion of rod 331 on actuation of the device. Chamber portions 321 and 322 are sized to receive piston 318 which carries O ring 319. The upper portion of piston 318 is an enlarged piston element 317 which is of sufficient diameter not to pass into chamber 321, 322. There is, however, sufficient clearance circumferentially around piston portion 317 so that movement of integral pistons 317 and 318 downwardly in chamber 315 will permit the liquid in chamber 315 to readily bypass the periphery of piston 317 and pass thereabove.

On derailment or actuation of this particular device by derailment of the railroad wheel nearest to which is positioned the described sensor cylinder and spring assembly of FIG. 14, piston 318 drops two inches in chamber 315 and then enters chamber 321, 322. O ring 319 on piston 318 then engages the chamber 322 walls and further motion downwardly of piston 318 will force oil out of chamber 321, 322 into passages 327 and 328. From thence, under the pressure of piston 318, oil passes out of passages 327 and 328, entering resettable check valve 121 through passage 123 (top of FIG. 6). This pressurized oil compresses spring 132 (FIG. 6), thus permitting the oil to pass into chamber 122 and thence into passage 124. This oil passes through a first flexible conduit as at 61', such flexible conduit joining to (see FIG. 11 and FIG. 8) tee 149', line 151', tee 152'and pipe 153' passing to the air relief valve 263 of FIGS. 11 and 13 to be described. This connection with the air relief valve 263 is made through tee 141' and into passageway 280 in FIG. 13 to be described.

During normal operation, piston 317 will be seated against the underside of intermediate wall 302. As the freight car encounters a bolted rail joint and drops up to one quarter of an inch, pistons 317, 318 will also drop one quarter inch within chamber 315 and, thereafter, return to the position seen in FIG. 14 when the railroad wheel contacts the lower rail length.

During a derailment, when the lower surface of piston 317 contacts lower wall 303 (upper surface thereof) and the rod end 334 attached to the railroad wheel truck continues to fall, cotterpin 332 will shear. However, the oil, which has been forced into the air relief valve 263, as will be further described, will remain trapped in the lines connecting this assembly 350 and the air relief valve assembly 263 (FIG. 13) because of the resettable check valve 121 piston 131 seating against the upper wall of chamber 122 in the manner seen in FIG. 6. This operation is opposite to the described operation in the fail open system previously described with respect to FIGS. 1–12 inclusive. The action of forcing oil into the air relief valve construction 263 to be described operates to release air from brake line 154 as will be described.

FIG. 13 AIR RELIEF VALVE

Referring to FIG. 13, therein is shown the fail closed system air relief valve 263. Valve 263 has lower body portion 265, intermediate body portion 266 and upper body portion 267. The upper body portion 267 has attachment flange 268 thereon with openings 269 therein for fastening the air relief valve 263 to the frame of the freight car. Upper body portion 267 also has nozzle outlets 270 for air relief. Lower cylindrical end 271 of upper body portion 267 is threaded on the outer side thereof at 267a for engagement with the upper threaded portion 272 of intermediate body portion 266. The inner central vertical neck of the nozzle 270 of upper body portion 267 at 271a serves as a shelf or stop for a piston to be described. Air flow passage 271b is provided in lower neck portion 271. Intermediate body portion 266 additionally has side outlet 273 extension to provide a connection to the freight car brake line 154 by a pipe or air line 264 (as at 64 in FIG. 1). The lower, lesser diameter end 274 of intermediate body portion 266 is externally threaded at 274a for engagement with the upper end 265a of lower body portion 265. A passage 275 exits through the lower end 274 of intermediate body portion 266.

Turning to the lower body portion 265, cavity 276 is formed through the middle and upper portions of body portion 265, the interior upper surface thereof internally threaded as at 277 to engage the externally threaded portion 274a of intermediate body portion 266. Air relief passage or air vent hole 278 is provided in the upper wall of body portion 265. The lowermost passage 279 in body 265 leads to an internally threaded fitting portion 280 to which connection is made to the sensor cylinders (FIG. 14) previously shown and described. Second passage 281 has internally threaded portions 282 thereof for a connection of a bleeder valve 133 (previously described re FIG. 7) thereat.

An elongate shaft 283 extends through openings, cavities and passages 276, 275, 266a and 271b and has upper piston 284 thereon which is adapted to seal with or against any suitable conventional seals on inclined shelf 271a in upper body portion 267. Shaft 283 is sealed by O-rings 285 in passage 275. Threaded on the lower end of shaft 283 is plunger 286 which has a lower, lesser outer diameter extension 287 extending into passage 279. Plunger 286 is sealed for reciprocation in chamber 276 by suitable conventional seals or O-rings 288.

Spring 289 spring normally loads plunger 286 and shaft 283 in a downward direction in the view, thus tending to hold piston 284 on seat 271a. When oil from the apparatus of FIG. 14 is forced through fitting 145' (See FIG. 11) into passage 279, plunger or piston 286, 287 will move upwardly, compressing spring 289 and thus unseating piston 284 from seat 271a. It is the force from spring 289 that maintains plunger 286, 287 in the position seen in the view of FIG. 13, thus also forcing piston 284 into air sealing contact with seat 271a. If oil were to be forced or pumped into passage 279, the plunger 286, 287 and shaft 283 would move rapidly upwardly in the view, compressing spring 289 in chamber 276, unseating piston 284 and thus permitting air from the freight car brake line 154 to exhaust into upper chamber 266a via line 264 and then under lifted piston 284 and out the nozzles 270.

Thus FIG. 14 and FIG. 13 compose the Fail Closed System, because the Air Relief Valve (FIG. 13) of said system will remain closed on loss of oil from any of the components thereof or any of the interconnecting hydraulic oil lines.

TELEMETRY SYSTEM

Both of the systems previously described, that is, the fail open and the fail closed systems, are commonly referred to as point of derailment, on-train derailment monitors (POD,OTDM). Both of these systems are designed to actuate the emergency air brakes on the derailed freight car at the instant of derailment A common problem to all POD, OTDM is buckling of the derailed freight car from the train immediately after the brakes are applied at the point of derailment. This buckling effect may result from the impact of the trailing freight cars, without simultaneous application of their brakes, with the derailed car which has first applied its brakes. Said otherwise, the brakes of the trailing freight cars sequentially and successively are applied at later instants of time than the application of the brakes on the derailed car. This buckling effect within the train could be compared to a folding of the freight cars like the bellows of an accordian.

This potential buckling effect is seen by the railroad industry as a potential problem which would perhaps create a fraction of, an equal amount or perhaps even more destruction than the POD, OTDM would prevent. It is for this reason that the following described telemetry system has been developed and made a part of this application. The telemetry system can basically be described as an electrical/electronic replacement for or improvement over the hydraulic systems delineated in the previous specification text and figures described. In contrast to such hydraulic systems, the telemetry system provides for (1) remote indication of the derailment in the locomotive of the train and/or (2) actuation of the emergency brakes starting at the end of the train (EOT). In any case, the telemetry system is designed to work in conjunction with either the fail open or fail closed derailment sensors which are shown in FIGS. 4 and 14, respectively.

The telemetry system set forth hereinafter provides for several innovations over the previously described POD, OTDM. These include:

(1) Generation of a pulse of electrical power from the energy of the freight car wheel derailment through an apparatus known as an electric pulse generator (EPG), which consists of a standard wound coil of wire coupled with a permanent bar magnet of standard design.

(2) Remote indication of the derailment and/or actuation of the emergency air brake beginning at the far end of the train from the locomotive at the instant of derailment, whereby to resolve the buckling problem which may be inherent with POD-ODTM.

A prototype of the most basic telemetry system (without any coding/decoding) has been developed with a fail open or pull sensor system (FIG. 4). The operation of this prototype can be described as follows:

(1) At the instant of derailment, the fail open sensor cylinder 90a (FIG. 4) draws oil from an electric pulse generator 640 (FIG. 16), thereby causing the bar magnet 610 to be drawn through a coil 630, thus producing a pulse of electrical energy. (Alternatively, the fail closed or push sensor cylinder 350 (FIG. 14) forces oil into chamber 620 of EPG 640, thus forcing magnet 610 upwardly through coil 630, producing a pulse of energy.)

(2) The current induced in the coil 630 completes a circuit through a bipolar transistor 812 or any other equivalent standard relay device, thereby causing or allowing a battery to drive a standard radio transmitter 650 in a transmission pulse.

(3) This transmitter is radio frequency linked to a remotely located, on-train radio receiver/air release valve 700 (FIG. 18). The radio receiver in turn will cause a light to be energized in the locomotive or the brake line of the train to be opened EOT or both. The former is in the locomotive and the latter is mounted at the end of the next to last car of the train.

The simplest functioning telemetry device is designed as a basic system as described above. This system or device will use a transceiver unit manufactured by Radio Systems Technology, Inc., model no. RST-542 or equal, for both the transmitter 650 in FIG. 17 and receiver 701 in FIG. 18. The frequency and power of the transmissions employed by the device must meet FCC/FRA regulations. The device will typically have more than six watts of power requirements.

This very simple, basic system, per se, previously described, would not itself probably be adopted by the railroad industry, because of a logistics problem. If we assume that the basic telemetry just described is installed on all freight trains in the country, a basic problem would immediately be encountered. That is, at the instant of derailment of one car on one of these trains, an emergency application of the brakes or indication of a derailment would be made in the derailed train, per se and, additionally, on each train in the close vicinity of the accident. This could happen with benefit under certain circumstances, but, in most cases, would be detrimental to the operation of the railroads in others. One object of the disclosure of this application is to indicate a schematic design for a universal telemetry system which could be used simultaneously by all railroads without interference between any two of these trains.

As will be seen, such universal telemetry system provides for a unique code for each individual train. The method by which a unique code is produced may be accomplished in a number of ways utilizing several presently well defined, commercially available methods of generating such codes. The use of such a unique code in conjunction with the derailment sensors (FIGS. 4 and 14), as well as the telemetry system, per se, provides for a novel and greatly advantageous approach to the complex problem of freight car derailments, per se and means for minimizing derailment damage without enhancing its development and increase. Disclosed hereinafter is one specific example of an assembly of commercially available products (i.e. radio transmitter, radio receiver and unique code generator) to replicate, restore, transmit and receive a unique code operable only within the length and cars of the given derailing train without interfering with other trains in the vicinity thereof.

Further, it is noted that the following transmission paths on a given train of the subject telemetry system may be significant:

(1) From the point of derailment (POD) of the freight car to the end of train (EOT) receiver;

(2) From the locomotive or head end of the train to the EOT receiver; thus allowing remote actuation of the brakes on the train from the end of the train forward, as opposed to the current practice of emergency brake actuation from the locomotive rearward;

(3) From the point of derailment freight car to the locomotive receiver giving a derailment signal (such as an indication light) and human controlled communication from the locomotive to the EOT receiver; this requires a transceiver in the locomotive with indicating light and switch to operate the transceiver transmitter. The device would operate off electrical power of the locomotive without a battery; and (4) From the point of derailment freight car to the locomotive receiver, solely, with only a derailment indication light.

Referring to FIG. 16, the assembly there illustrated is the electric pulse generator (EPG) 640. There are two electric pulse generators required per freight car, one for each set of four sensor cylinders and leveler spring assemblies as shown in previous figures. The EPG 640 shown in FIG. 16 in full lines is designed to be used in conjunction with "push" type sensor cylinder illustrated in FIG. 14. The dotted line (piston and rod 610 up) showing of FIG. 16 shows the starting position for piston 605 and rod (magnet) 610 when the "pull" type of sensor cylinder of FIG. 4 is employed.

The EPG (FIG. 16) is designed to produce a small electrical power surge at the instant of derailment and, as a direct result of the actuation of a sensor cylinder (FIG. 14 or FIG. 4) to which the EPG is hydraulically connected through pipe tee 141' as shown in FIG. 16. The electrical pulse generators 640 operate to replace the air relief valve 263 seen in FIG. 11 or 63 in FIG. 4.

The EPG in FIG. 16 will be bolted to the freight car body through holes 601 in flange 602 attached to cap 603 (similar to Air Relief Valve 63 in FIG. 1). Cap 603 contains solenoid coil 630, nipple 644 and nut 643. Nipple 644 and nut 643 supports the connection of the two wire cable 645 to solenoid coil 630. Threaded into 603 and supporting solenoid coil 630 is housing 600. Contained within housing 600 is piston 605 and stem 605a. A conventional O-ring 604 on piston 605 makes an hydraulic seal with housing 600. Piston 605a and stem 605 are connected to permanent bar magnet 610 by threaded end 615. The permanent bar magnet 610 is contained in solenoid coil 630. Spring 625 is also contained in housing 600, supported at its upper end by the underside of solenoid coil 630 and at its lower end by piston 605. Threaded to the lower end of housing 600 is end housing 635. Housing 635 contains oil chamber 620, a bleeder valve 133, lower passage 634 and threaded connection 636 for pipe tee 141''. Oil filling of chamber 620 will require the same procedure as described for Air Relief Valves 63 or 263, previously described in this text.

On derailment, sensor cylinder 350 (FIG. 14) will push oil via lines 61', 153'' into oil chamber 620 via pipe tee 141'', pipe 145'' and nominal hydraulic piping as shown elsewhere (FIGS. 11 and 8) in this specification. As oil enters chamber 620, piston 605 and stem 605a will compress spring 625 and drive permanent bar magnet 610 up through solenoid coil 630, thereby inducing electrical energy in solenoid coil 630. Alternatively, on derailment, sensor cylinder 90a will draw or permit passage of oil into chamber 16 via pipe tee 141, line 153, pipe 150 or 151 and one line 59–62 through valve 121. Piston 605, under compression of spring 625 drives oil out tee 141''. Thus, magnet 610 is pulled down through coil 630, inducing energy therein.

FIG. 17

Now turning to FIG. 17, a radio frequency transmitter 650 is illustrated therewithin. There is only one transmitter 650 per freight car and it is connected to both of the EPGs 640 on that car by the four wire cable 646. The transmitter 650 is typically composed of the following known and conventional parts (not shown): a card reader device, two eight bit digital integrated circuit memory registers, an encoder/transmitter chip (for example, National Semiconductor LM1871 or equal), a tuned radio frequency (R.F.) transmitter circuit, an antenna 650a and batteries. A typical arrangement of these components is described in FIG. 19. The latter three elements are the minimum for a working transmitter without a coded signal.

The card reader can use any of several commercially available mechanisms to read a code into the memory register of transmitter 650. These include optoelectric punch cards, bar codes and/or magnetic coded strips. The card reader is designed to read a binary code into the memory register of the transmitter 650. This code will be held in memory until another code is read into the memory. The EPG 640 will be electrically connected to the encoder/transmitter chip. On derailment, the pulse of electrical energy generated by the EPG 640 will initiate a clock pulse within the encoder/transmitter chip which will then pulse the binary code in the memory register into the encoder/transmitter chip. The encoder/transmitter chip will, in turn, generate a pulse width modulated radio signal from the binary code. This radio signal will then be amplified in the tuned circuit and broadcast through the antenna 650a.

Each train employing the subject system in the United States must have a unique or individual binary code for use with this system, as described previously. Unique coded radio signals are required to prevent unwanted application of the brakes on trains in the vicinity of a derailment accident which may receive the radio signal of the distressed train. Assuming trains in the vicinity of an accident are equipped with this device, then a method of transmitting and selecting a unique code, different from each other train's radio signal, must be established or else all trains within, say, two miles of the derailment will be affected. The method of selecting a unique signal before actuation of the brakes will be left for the description of FIG. 19. The method of setting up a train with a unique code unto itself will be described henceforth However, for the purposes of basic disclosure, it is here stated that transmitter 650, powered by the pulse of energy from solenoid coil 630, need only send a signal of a character to be able to be received by the receiver to be described which will activate the device and system to be described re FIG. 18.

More specifically, when a train is first made up before departure, each of the car men will be given a card (about the size of a credit card) with a unique code for that train inscribed thereon. As the car men make up the train, that is, couple the air lines between each car together, he (or they) will place such card into the card reader of each freight car equipped with the FIG. 14, FIG. 16 and FIG. 17 devices described herein. After the binary code is read into the memory registers, a signal light on the card reader will come on and, then, the car man will remove the card and proceed to the next freight car. In this way, all the subject FIG. 14, FIG. 16 and FIG. 17 device equipped cars within the train will receive and thereafter use only the same unique code (until reinstated with a new unique code).

However, if a new car is switched into the train, the memory pattern or code of the newly placed car must be established with or changed to the unique code for the train it is now in. As mentioned before, the memory register of the transmitter 650 can easily be reset by placing a card into the reader. Just as before, the car man will hook up the brake line and place the card into the card reader thus establishing the correct transmitter/receiver code for the train before the train departs.

FIG. 18

Referring now to FIG. 18, the end of the train (EOT) radio receiver 700 and the entire air relief valve mechanism 750 are detailed therein. The entire air relief valve assembly shown in FIG. 18 will be hereinafter generally referred to as the relief valve 700. The radio receiver, per se 701 is tuned to the same frequency as that of the transmitter 650 in FIG. 17. Receiver 701 (when fitted for the unique code system described) typically consists of a commercially available card reader (previously described), four eight bit memory registers, a binary digital comparator circuit, a transistor or power integrated circuit (I.C.) acting as a switch, a decoder/receiver chip (i.e. National Semiconductor L.M. 1872 or equal) and a tuned radio frequency receiver circuit 701.

External to EOT receiver 700, and attached to housing 715 is antenna 705. Contained in housing 715 with receiver assembly 701 is slide valve 720, solenoid 710, batteries 725 and pipe nipple 730. Nipple 730 connects air relief valve nozzle 750 with conventional slide valve 720. Nut 740 secures housing 715 in the position shown in FIG. 18. Hollow pipe 735 connects slide valve 720 to the conventional double "glad hand" type tee 745.

The double glad hand type tee 745 is a uniquely designed fitting which conforms to the Association of American Railroads (AAR) design criteria for brake line hose couplings, otherwise known as "glad hands". Fitting 745 is designed to allow the EOT air relief valve assembly 700 to be installed on the forward couplers of the last freight car in the train and connected directly into the air brake line 154 of the train via fitting 745. Pin 755 is designed to structurally support the EOT receiver 700 from the forward coupler of the last car in the train. The configuration of pin 755 is a circular cross section bar extending outwardly from the top of nozzle 750, such then turning downwardly as a vertical bayonet member (not shown) on a center line parallel to and offset from the center line of pipe nipple 735.

This downwardly directed bayonet member (not shown) is offset from the center line of EOT assembly 700. The bayonet member will be inserted into an already present hole passing through the said freight car coupler (flag staff hole). This hole is standard on all AAR approved couplers for interchange service. Therefore, the EOT receiver 700 will be suspended by the bayonet/member/pin 755 in a cantilever fashion from the coupler of the freight car. A suitable removable pin locks the bayonet member in the said flag staff hole to fixedly mount device 700 with respect to the said coupler.

Now turning to the typical installation procedure and operation of the EOT assembly 700, a car man will bring the EOT assembly 700 to the one of the couplers of the last car in the train and insert the bayonet/member/pin 755 into the (not seen) flagstaff hole in one of the couplers (as previously described). He then connects the air hoses from the last car and the next to last car in the train to opposite sides of fitting 745 and, finally, inserts the card with the unique code for that train in the card reader in receiver 701, as previously described in the description of FIG. 17. The card reader will read and store the unique code in binary memory exactly as is done by the card reader in the transmitter 650 shown in FIG. 17.

When a freight car (equipped with the devices of FIGS. 4 or 14, 16 and 17 in the manner seen in FIG. 8 or FIG. 11 where device 640 replaces devices 63 and 263, respectively) derails, a radio signal (preferably encoded) will be broadcast by transmitter 650 on that car and received at the end of the train by receiver 701. This signal will then be decoded and compared to the unique code stored in the memory register of the receiver unit. If this code exactly matches the unique code stored in the memory register of the receiver unit, then the transistor or power I.C. will open, allowing electrical power from batteries 725 to energize solenoid coil 710 thereby opening slide valve 720 to provide an air flow passage therethrough. This allows compressed air in the train brakeline connected to fitting 745 to exhaust through fitting 745, hollow rod 735, slide valve 720, nipple 730, thence through passage 751 in upper body 752 and out nozzles 750.

The exhausting of the air brakeline causes an emergency application of the brakes on the train as previously described. However, this application begins at the end of the train and moves forwardly.

Slide valve 720 remains open, exhausting brakeline 154 as long as solenoid coil 710 is energized. An alternative (optional) arrangement would be to install a pin and an electrical switch between slide valve 720 and coil 710 to lock slide valve 720 in an open position once activated and de-energize the coil 710. In any case, slide valve 720 must remain open until manually reset.

Other engineering features which may be added to this design to make such more useful and easily used by the railroad industry include:

(1) Each locomotive could have a transmitter like the one described in FIG. 17, but with one difference: A pushbutton would replace the EPG 640 of FIG. 16 so that the engineer in the locomotive could initiate emergency application of the brakes at the end of the train by pushing a button to send the required, coded radio signal to the end of the train and EOT receiver 701.

(2) A pressure transducer connected to the car brakeline 154 would activate an alarm buzzer located in the transmitter device shown in FIG. 17, if a card was not inserted into the card reader in a certain time (i.e. 30 seconds) after the brakeline was coupled.

FIG. 19

Referring now to FIG. 19, block diagrams of the coded transmitter 650 and the coded receiver 701 are delineated therein. Both transmitter 650 and receiver 701 contain one card reading device 825. The card reader 825 can be one of several designs, as previously described. However, the two card readers 825 as shown in FIG. 19 are of an optoelectric design consisting of the following primary electronic components: 801 and 802 are matched emitter/detector pairs of General Electric Corporation Model #H23B1 or equal. Sixteen emitter detector pairs will be required per card reader 825. 803 is a voltage amplifier National Semiconductor LM 748 or equal. Sixteen voltage amplifiers will be required per card reader 825. 804 is two cascaded binary digital code 8 bit memory registers National Semiconductor SN 54LS165 or SN 54LS299 or SN 54LS164 or equal. One memory register will be required per card reader 825. 814 is a single pole double throw (S.P.D.T.) lever microswitch which is commercially available from numerous manufacturers. Switch 814 will energize element 801 when a card to be read contacts the said switch.

Now returning to the block diagram 650 for transmitter 650, component 805 is a digital to analog converter (D.A.C.) National Semiconductor DAC0807 or equal. One DAC will be required per transmitter 650. The binary code from memory 804 in card reader 825 will be converted into an analog signal by the DAC 805. This signal will then be encoded and amplified by the encoder/transmitter chip 806, National Semiconductor Model L.M. 1871 or equal. This analog signal will then be conducted into a typical commercially available tuned radio frequency transmitting circuit 807 (transmitter 650) for broadcast from the antenna 650a.

The radio broadcast will be received by antenna 705 on EOT receiver 700. The analog signal will then be conducted into the tuned radio frequency receiver 808 (Receiver 701). This receiver is a commercially available standard unit produced by numerous manufacturers. Both transmitter 807 and receiver 808 will be subject to the Federal Communications Commission (FCC) and Federal Railroad Administration (FRA) rules, regulations and licensing requirements.

The radio signal will be amplified by receiver 808 then conducted into decoder chip 809, National Semiconductor Model #L.M. 1872 or equal. The analog signal will be mixed, its intermediate frequency (I.F.) will be amplified and decoded into a binary digital code (BDC) in chip 809. The BDC will then be stored in two cascaded 8 bit memory register 810. Memory register 810 are the same as that of 804. The stored BDC in registers 810 will then be compared by comparator circuit 811 to the BDC stored in 804 in comparator 811. (Note: 804 is a component of card reader 825 which is common to both transmitter 650 and receiver 701.) If these codes being processed in receiver 701 are identical, then bipolar power transistor 812 will be opened, allowing solenoid coil 710 to be energized and slide valve 720 opened to vent the brakeline, as previously described. Comparator 811 is a state of the art circuit which is published in Electronics Book Case #5, Page 102, 1982, McGraw Hill, Inc., ISBN 0-07-606808-0.

FIG. 20

In the evaluation of the previously described systems for derailment train braking, there remain two maintenance problems which could preclude the acceptance of the subject invention by the railroad industry. These two maintenance obstacles are:

(1) The use of hydraulic systems (FIGS. 8 or 11) on freight cars; and/or (2) The need for a battery (FIG. 17) to drive the transmitter 650 on each freight car.

Figure 20:
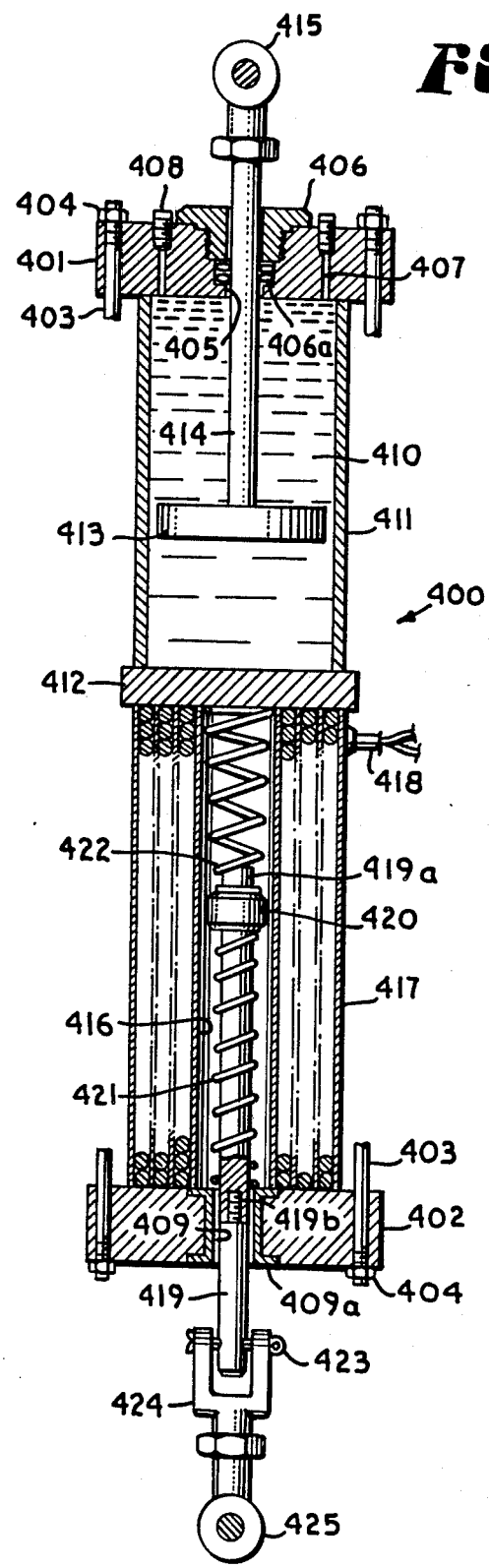
FIG. 20 is a side, cross sectional view of a derailment electrical generator.

Accordingly, I have further developed the subject inventive concept and additionally designed the system of FIG. 20 wherein the entire hydraulic system will be eliminated, as well as the battery requirement, such latter to be replaced by a solid state electrical generator mechanism to be driven by the forces of derailment. The hydraulic components which are to be replaced include the sensor cylinder/spring assembly (FIGS. 4 and 14), the hydraulic schematic (FIGS. 8 and 11) and the EPG (FIG. 16). The replacement for these systems is a derailment electrical generator (DEG), as seen in FIG. 20.

The derailment electrical generator (DEG) 400 consists of a frame top wall 401 and a frame bottom wall 402, such connected to one another by rods 403 threaded at both ends to receive nuts 404 thereon. In wall 401, there is provided central opening 405 which receives gland 406 with O ring seals associated therewith (unnumbered). Oil ports 407 have removable plugs 408 therein.

With respect to lower plate or wall 402, there is a single central opening 409 therethrough. This wall is plastic or non-ferrous metal.

Upper chamber 410 is defined by upper wall 401, cylindrical wall 411 and center wall or plate 412. The latter is plastic or non-ferrous metal. Chamber 410 is a oil chamber and piston 413 is received therewithin, such mounted on the lower end of piston rod 414. The upper rod end 415 is attached to the car body in the same manner as rods 46a–49a, inclusive are in FIGS. 1 and 2.

Lower chamber 416 is defined by wall 417, which is a standard wound coil reinforced as may be required for this application. From coil 417, two wire cable 418 is connected to the transmitter 650 (not here seen).

Nonferrous bar 419, 419a extends through opening 409 into chamber 416 (the interior of the coil) and carries centrally thereof permanent bar magnet 420. Nonferrous compression springs 421 and 422 abut against the inside surfaces of walls 402 and 412 and, on the other ends thereof, against the magnet 420. Rod 419, 419a is attached by cotter pin 423 to a clevis/rod end assembly 424 similar to that seen on the lower end of rod 114 in FIG. 4. The rod end assembly loop 425 is attached to the truck side frame in the same manner as seen in FIGS. 1 and 2 at 42, 44 and 45 (43 unseen). The oil chamber 410 and piston assembly 413, 414 is similar to an automobile shock absorber of the dash pot type.

In the action of the latter, the ends of chamber 410 are closed except for the small hole 405 which allows shaft 414 to be attached to the piston, cylinder or plunger 413. Casing 411 is filled with oil and the shaft 414 is sealed so that oil cannot leak out around it. The small clearance between the outer periphery of piston 415 and the inner face of wall 411 impedes the flow of oil from the front of the plunger to the rear, or vice versa, so that the piston/plunger 413 can only move very slowly. As piston 415 moves, oil must flow around it through the small passage created by the clearance.

Thus it can be seen that the derailment electric generator (DEG) 400 will consist of a permanent bar magnet 420 (carried by rod or rod elements 419 and 419a) placed between two nonferrous compression springs 421 and 422 enclosed by a standard wound coil 417 in a plastic housing. One lower side of the magnet 420 is connected to nonferrous rod length 419 extending through opening 409.

There will be eight DEG per freight car, one at each wheel location. All eight DEG will be directly connected to transmitter 650 with electrical wires as at 418.

On derailment, the magnet 420 in the DEG will be pulled through the coil, compressing lower spring 421 and causing cotter pin 423 to shear. Upon pin shear, the magnet will be released to oscillate in the lower housing 402, 417, 412, between springs thereby generating six watts or more of power to drive transmitter 650 and cause a radio signal to be broadcast to receiver 700. This DEG 400 is designed to produce or generate electrical energy as the result of and from the force of the derailment at the instant of derailment. Thus, the subject device fulfills criteria set forth by the railroad industry for a self-contained, maintenance free derailment sensor and telemetry system.

As previously noted, in FIG. 20 a derailment electrical generator (DEG) is shown. The DEG 400 is designed to generate electrical power from the forces of the freight car wheel derailment at the instant of and for several moments after the derailment occurs. This DEG has been designed responsible to the interest of the railroad industry in a self contained, maintenance free, derailment sensor. The railroad industry currently views a hydraulic system used in conjunction with the failed open system (FIGS. 3, 4 and 8), fail closed system (FIG. 13, 14 and 11), plus the EPG (FIG. 16) as potentially and possibly embodying certain maintenance problems, perhaps even continual such. Therefore, the DEG 400 has been designed to eliminate the hydraulic systems, battery and such like sources of concern for the railroad industry.

As previously noted, the DEG 400 consists of an integral apparatus including piston 415 attached to stem or rod 414 which is connected at its upper end to rod end 415. Rod end 415 is fastened to the freight car body by a bracket 50 as seen in FIG. 1. Piston 415, being contained in chamber 410 operates as a dash pot because cylinder or chamber 410 is filled with oil and enclosed by the cylindrical wall 411 and top and bottom walls 401 and 412. The outside diameter of piston 415 is nearly equal to the inside diameter of the cylinder housing 411. As noted, this arrangement is commonly referred to as a dashpot or damper with similar application in automobile shock absorbers. Such a dashpot may be substituted in the devices of FIGS. 4 and 14 for chambers 98 and 313, respectively.

Turning to upper plate 401, therein is contained gland 406 with O rings seals in order to seal the reciprocating rod 414 against loss of oil from chamber 410. This design is similar to the sealing device used in FIGS. 4 or 14. Also contained in upper wall 401 are two plugs 408 used to fill chamber 410 with oil.

Intermediate plate or wall 412 is provided as the lower containment surface of chamber 410 and as an upper platform to support coil 417 and spring 422. Coil 417 is a standard wire wound commercially available electrical coil with a two conductor shielded cable 418 which will be directly connected to transmitter 650. Coil 417 is similar to coil 630 shown in FIG. 16 except coil 417 would be larger than coil 630, with enough wire windings to produce at least six watts of electrical power as the permanent bar magnet 420 osicates on springs 421 and 422 within coil 417. Spring 421 is designed with twice the spring constant of spring 422.

Contained in lower wall or plate 402 is passage 409 defined by a non-ferrous bushing 409a (similar to bushings in FIGS. 4 and 14) for reciprocation of magnet 420 and non-ferrous bar or rod 419, 419a.

Non-ferrous rod 419 is attached to the lower end of magnet 420 by threads 419a. Bar or rod 419 is connected at its lower end to clevis 424 which in turn is fastened to the freight car truck side frames by bracket 46 et al per FIG. 2. Clevis 424, cotter pin 423 and rod end 425 are the same as those shown in FIGS. 4 and 14.

OPERATION

As previously described, the primary function of the derailment electrical generator (DEG) of FIG. 20 is to produce at least six watts of electrical power generated solely by the force of the railroad car wheel derailment. Such power generation results from the oscillation of magnet 420 in coil 417 caused by springs 421 and 422.

The reaction of the DEG 400 to a derailment is as follows.

The railroad car wheel and truck side frame (shown in FIGS. 1 and 2) will fall from the rail to the ground or road bed almost instantaneously. Magnet 420 is attached to the truck side frame through rod 419, clevis 424, cotter pin 423, rod end 425 and bracket 46 et al shown in FIG. 2. Therefore, the fall of the truck side frame will cause spring 421 to be compressed solid against bottom wall 402 by the underside of magnet 420. After spring 421 has been compressed solid (requires a four inch displacement), the truck side frame continues to drop another 1 to 1½ inches depending on the height of the rail from which it has fallen. Magnet 420 and compressed, solid spring 421 are caused to drop, along with the side frame, and such begin to pull DEG assembly 400, with the exception of piston 415, rod 414 and rod end 415, with them. However, because of the small clearance in the dashpot between piston 415 and cylinder housing 411, oil in chamber 410 cannot pass around piston 415 as fast as housing 411 and/or DEG 400 is falling.

Therefore, a back pressure or force is created which resists DEG 400 from being pulled down. This force is greater than the shearing strength of cotter pin 423 and causes it to fail. This failure of cotter pin 423 releases magnet 420 et al to be driven by spring 421 back into spring 422 which then reverses, allowing magnet 420 to oscillate in coil 417, thereby producing electrical power to drive transmitter 650 and broadcast a radio frequency of the instant and for moments after derailment.

During the normal over-the-rail operation of the DEG 400, bolted joints in the rail (i.e. drops of one quarter of an inch) and normal vibrations of approximately one inch amplitude will be encountered, causing the magnet 420 to oscillate in coil 417 and thereby generate a small amount of power. Since there will be 8 DEG 400's per freight car (one at each wheel), the total combined random power generation is expected to be several watts, but never more than six watts.

Therefore, since transmitter 650 is designed to broadcast the unique code of the train stored in its memory at a threshold level of 6 watts of electrical power, these random pulses of energy (less than 6 watts) should not effect the operation of the train or telemetry system. Only on derailment will the DEG 400 instaneously generate 6 or more watts of electrical power, thereby driving the transmitter to broadcast the unique code to stop the train, as previously described in this application.

INSTALLATION

Each DEG 400 will be installed on a freight car by simply attaching rod ends 415 and 425 to their respective brackets on the car. Clevis 424 is then aligned with rod 419 and cotter pin 423 inserted. Brackets shall be installed on the freight cars previously described in this text. An electrical conductor and cable shall be installed on the freight car between each DEG 400 and the transmitter 650. Set up of transmitter 650 on each freight car, when the train is initially made up, will be as previously described.

The device of FIG. 20 can be employed in at least three ways. In stating the uses, it is understood that a railway or railroad train is involved which has a locomotive and at least two freight cars in said train. A first one of said freight cars is forwardly located in said train and a second one of said freight cars is rearwardly located in said train. Each freight car has (a) a car body and a car body supporting frame, (b) sets of pairs of wheels mounted on paired axles, (c) each axle carrying two wheels, one of said wheels near each respective end of said axle, (d) truck side frames connecting pairs of said axles on opposite ends thereof, (e) opposed ones of said side frames mounting bolsters therebetween, (f) said bolsters carrying said car frame and body and (g) an airbrake line running the length of said car.

FIRST FIG. 20 USE

In a first use of the FIG. 20 device in question, first means on said first forward freight car coupled with each wheel thereon are operative, upon derailment of one or more wheels of said car, to transmit a radio frequency signal from a radio transmitter on said first car to a receiver on said second freight car. This first means comprises the device 400 of FIG. 20, as well as the transmitter, per se, of FIG. 17, one mounted on each said forward freight car.

There is also provided second means on said second, rearward freight car coupled with the air brake line of said second car operative, which means are on receipt of said signal by a radio receiver on the second car, to vent said air brake line to atmosphere. This device is that shown in FIG. 18 and previously described.

Also, as described with respect to FIG. 20, the first means on the first forward freight car (the device of FIG. 20) coupled with each wheel thereon includes a permanent bar magnet 420 positioned within a coil 417 operable to move and oscillate a considerable distance within said coil 417 upon derailment of one or more wheels of said car, thereby powering, through wires 418 to transmitter 650 of FIG. 17, said radio frequency signal from said radio transmitter 650 to the receiver of the device of FIG. 18 on said second rearward freight car.

FIG. 20 SECOND USE

The second use of the device in question involves providing, on at least one freight car in the train (preferably most of all thereof devices or first means coupled with each wheel thereon operative, upon derailment of one or more wheels of said car, to transmit a radio frequency signal through a radio transmitter on said first car. This first means comprises the device of FIG. 20 with at least one radio transmitter as in FIGS. 17 and 19. Second means on the locomotive operative to receive the signal may merely include (1) a standard radio receiver tuned to the frequency of the signal to be broadcast from the transmitter of the first forward freight car and (2) any suitable alarm means such as a flashing light and/or a sound alarm in said locomotive coupled with said receiver, thus to alert the locomotive personnel of the train to the derailment. This means that any application of the brake system on the train must be carried out by a knowing choice and act on the part of the locomotive personnel. Such use of the brake system, unless the next, following alternative is employed, merely comprises setting the brakes in the regular manner from the locomotive, whereby the use of the device of FIG. 20 and the transmitter of FIG. 17 merely serve to alert the locomotive personnel of the train to the derailment immediately as it occurs.

FIG. 20 THIRD USE

The third manner of utilizing the subject improvement of FIGS. 20, 17 and 18 involves the following.

There are first means on the first forward freight car coupled with each wheel thereon operative, upon derailment of one or more wheels in said car, to transmit a radio frequency signal to said locomotive from a radio transmitter on said derailed first car This is the device of FIG. 20, used as shown in the manner of the eight devices of FIGS. 1 and 2 coupled between the side frames and the car or car frame Also the transmitter of FIGS. 17 and 19 actuatable by any one of the eight FIG. 20 devices on the given freight car.

Further in this third case, there must be means provided on said locomotive, including a radio receiver, operative to receive said radio frequency signal from the transmitter on the first forward car, as well as any conventional signal means in said locomotive coupled with said receiver operative, say by sight and/or sound alarm, to alert the locomotive personnel of the train to the derailment. Then there is provided, in said locomotive, a second radio transmitter operative, upon actuation thereof by the locomotive personnel, to transmit a second, different radio frequency signal to said second, rearward freight car. Means (see FIG. 18) are provided on said second, rearward freight car, including a radio receiver, which are coupled with the air brake line of said second freight car operative, on receipt of said locomotive transmitter radio frequency signal, to vent said air brake line to atmosphere.

As previously noted, the dashpot arrangement seen in the top portion of FIG. 20 may be substituted for the piston and spring assembly at 98, 99 in FIG. 4 and 312, 313 of FIG. 14.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A railroad train having at least one freight car therewithin, said freight car having (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body and an air brake line running the length of said car,
   (1) a first, normally full hydraulic chamber received in a first assembly connected at one upper end thereof to one of said car body and said car frame,
   (2) a separate, second, normally empty hydraulic chamber in a second assembly also connected at one upper end thereof to one of said car frame and car body,
   (3) a normally full hydraulic fluid line extending between said first and second hydraulic chambers with a one way valve thereon so that fluid pumped from said first chamber will go into said line and second chamber and not return into said first chamber without resetting of said valve,
   (4) a piston in said first hydraulic chamber with a piston rod connected at its free end to one end of one of said truck side frames, said piston normally located at the chamber full position in said first hydraulic chamber,
   (5) means associated with said second hydraulic chamber and said air brake line operative to open and vent said air brake line when hydraulic fluid is driven into said second, normally empty hydraulic chamber,
   (6) said latter means including a spring loaded piston in said second chamber normally biased to the chamber empty position operative to be driven to a chamber full position when hydraulic fluid is forced into said second chamber from said line, and
   (7) the piston and piston rod of the first hydraulic chamber operating to drive hydraulic fluid from said first hydraulic chamber into said line and second hydraulic chamber when the wheel at the end of the truck side frame to which said rod is attached derails.

2. A railroad train having at least one freight car therein within, said freight car having (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body, and (g) an air brake line running the length of said freight car,
   (1) a first, normally empty hydraulic chamber in a first assembly connected at one upper end thereof to one of said car body and said car frame;
   (2) a separate, second, normally full hydraulic chamber in a second assembly also connected at one upper end thereof to one of said car frame and car body;
   (3) a normally full hydraulic fluid line extending between said first and second hydraulic chambers with a one way valve thereon so fluid pumped from said second chamber will go into said line and first chamber and not return into said second chamber without resetting of said valve;
   (4) a piston in said first hydraulic chamber with a piston rod connected at its free end to one end of one of said truck side frames, said piston normally located at the chamber empty position in said first hydraulic chamber;
   (5) means associated with said second hydraulic chamber and said air brake line operative to open said air brake line when hydraulic fluid is driven from said second hydraulic chamber into said line and first hydraulic chamber;
   (6) said latter means including a spring loaded piston normally located in said second hydraulic chamber at the chamber full position operative to drive hydraulic fluid from said second chamber when said one way valve is opened,
   (7) the piston and piston rod of the first hydraulic chamber operating to open said valve and permit hydraulic fluid to be driven from said second hydraulic chamber into said line and first hydraulic chamber when the wheel at the end of the truck side frame to which said rod is attached derails.

3. A railroad train having a locomotive and at least two freight cars therewithin, one first said car forward and one second said car rearward in the train, each freight car having (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body and (g) an air brake running the length of each said car, said first, forward freight car having:
  (1) a first, normally full hydraulic chamber received in a first assembly connected at one upper end thereof to one of said car body and said car frame,
  (2) a separate, second, normally empty hydraulic chamber in a second assembly also connected at one upper end thereof to one of said car frame and car body,
  (3) a normally full hydraulic fluid line extending between said first and second hydraulic chambers with a one way valve thereon so that fluid forced from said first chamber will go into said line and second chamber and not return into said first chamber
  (4) a piston in said first hydraulic chamber having a piston rod connected at its free end to one end of one of said truck side frames, said piston normally located at a chamber full position in said first hydraulic chamber,
  (5) means associated with said second hydraulic chamber, including a radio frequency transmitter, operative to transmit a radio signal when hydraulic fluid is driven into said second, normally empty, hydraulic chamber,
  (6) said latter means including a spring loaded piston in said second chamber normally biased to the chamber empty position but operative to be driven to a chamber full position when hydraulic fluid is forced into said second chamber from said line, and
  (7) the piston and piston rod of the first hydraulic chamber operating to drive hydraulic fluid from said first hydraulic chamber into said line and second hydraulic chamber when the wheel at the end of the truck side frame to which said rod is attached derails.

4. A device as in claim 3 wherein, on the second, rearmost freight car, there is provided:
  (1) a radio frequency signal receiver adapted to receive the signal transmitted from the first forward freight car transmitter,
  (2) a secondary air line connecting to said air brake line,
  (3) means containing a valve opening to atmosphere in said secondary air line, and
  (4) means coupled with said receiver operative to open said valve on receipt of said transmitter signal.

5. A device as in claim 3 wherein, on the locomotive, there is provided a radio frequency signal receiver adapted to receive the signal transmitted from the first forward freight car transmitter and signal means is said locomotive to alert the engineer of the train to the derailment.

6. A device as in claim 3 wherein, on the locomotive, there is provided a radio frequency signal receiver adapted to receive the signal transmitted from the first forward freight car transmitter and signal means in said locomotive coupled with said receiver to alert the engineer of the train to the derailment,
  there being a second radio frequency transmitter within said locomotive adapted to be actuated by the locomotive personnel upon receipt of the signal in the locomotive of the derailment,
  a second radio frequency signal receiver adapted to receive the latter signal transmitted from the second transmitter in the locomotive,
  a secondary air line connected to said air brake line,
  means containing a valve opening to atmosphere in said secondary air line and
  means coupled with said second receiver operative to open said valve on receipt of said second transmitter signal.

7. A device as in claim 3 wherein, on the second, rearmost freight car, there is provided:
  (1) a radio frequency signal receiver adapted to receive the signal transmitted on the first forward freight car transmitter,
  (2) a secondary air line connecting to said air brake line,
  (3) means containing a valve opening to atmosphere in said secondary air line, and
  (4) means coupled with said receiver operative to open said valve on receipt of said transmitter signal,
  there also being provided, on the locomotive:
  (5) a second radio frequency signal receiver adapted to receive the signal transmitted from the first forward freight car transmitter and
  (6) signal means in said locomotive coupled with said second receiver to alert the engineer of the train to the derailment and the actuation of said emergency brake release.

8. A railroad train having a locomotive and at least two freight cars therewithin, one first car forward and one second car rearward in the train, each freight car having: (a) a car body and car body supporting frame, (b) sets of pairs of wheels mounted on paired axles, (c) each axle carrying two wheels near the respective ends thereof, (d) truck side frame connecting pairs of said axles on opposite ends thereof, (e) opposed ones of said side frames mounting bolsters therebetween, (f) said bolsters carrying said car frame and body and (g) an air brake line running the length of said freight car, said forward freight car also having:
  (1) a first, normally empty hydraulic chamber in a first assembly connected at one upper end thereof to one of said car body and said car frame;
  (2) a separate, second, normally full hydraulic chamber in a second assembly also connected at one upper end thereof to one of said car frame and car body;
  (3) a normally full hydraulic fluid line extending between said first and second hydraulic chambers with a one way valve thereon so fluid pumped from said second chamber will go into said line and first chamber and not return into said second chamber without resetting of said valve;
  (4) a piston in said first hydraulic chamber having a piston rod connected at its free end to one end of one of said truck side frames, said piston normally located at the chamber empty position in said first hydraulic chamber;
  (5) means associated with said second hydraulic chamber including a radio frequency transmitter operative to transmit a radio signal when hydraulic fluid is driven out of said second, normally full hydraulic chamber, (6) said latter means including a spring loaded piston normally located in said second hydraulic chamber at the chamber full position operative to drive hydraulic fluid from said second chamber when said one way valve is opened, and (7) the piston and piston rod of the first hydraulic chamber operating to open said valve and permit hydraulic fluid to be driven from said second hydraulic chamber into said line and first hydraulic chamber when the wheel at the end of the truck side frame to which said rod is attached derails.

9. A device as in claim 8 wherein, on the second, rearward freight car, there is provided:

(1) a radio frequency signal receiver adapted to receive the signal transmitted from the first forward freight car transmitter, (2) a secondary air line connected to said air brake line, (3) means containing a valve opening to atmosphere in said secondary air line, and (4) means coupled with said receiver operative to open said valve on receipt of said transmitter signal.

10. A device as in claim 8 wherein, on the locomotive, there is provided a radio frequency signal receiver adapted to receive the signal transmitted from the first forward freight car transmitter and signal means in said locomotive coupled with said receiver to alert the personnel of the locomotive to the derailment.

11. A device as in claim 8 wherein, on the locomotive, there is provided a radio frequency signal receiver adapted to receive the signal transmitted from the first forward freight car transmitter and signal means in said locomotive coupled with said receiver to alert the personnel of the locomotive to the derailment, there being a second radio frequency transmitter within said locomotive adapted to be actuated by the locomotive personnel upon receipt of the signal in the locomotive of a derailment, a second radio frequency signal receiver positioned on said second freight car adapted to receive the latter signal transmitted from the second transmitter in the locomotive, a secondary air line on said second freight car connected to said air brake line of said second freight car, means containing a valve opening to atmosphere in said secondary air line and means coupled with said second receiver operative to open said valve on receipt of said second transmitter signal.

12. A device as in claim 8 wherein, on the second, rearmost freight car, there is provided:

(1) a radio frequency signal receiver adapted to receive the signal transmitted by the first forward freight car transmitter, (2) a secondary air line connecting to said air brake line, (3) means containing a valve opening to atmosphere in said secondary air line, and (4) means coupled with said second freight car receiver operative to open said valve on receipt of said first freight car transmitter signal, there also being provided, on the locomotive:

(5) a second radio frequency signal receiver adapted to receive the signal transmitted from the first forward freight car transmitter and (6) signal means in said locomotive to alert the personnel of said locomotive to the derailment and the actuation of said emergency brake release.

13. A railroad train having at least two freight cars therewithin, a first one of said cars forwardly located in said train and a second one of said cars rearwardly located in said train, each freight car having: (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body and (g) an air brake line running the length of said car:

(1) means on said first forward freight car coupled with each wheel thereon operative, upon derailment of one or more wheels of said car, to transmit a radio frequency signal to said second freight car and (2) means on said second, rearward freight car coupled with the air brake line of said second car operative, on receipt of said signal, to vent said air brake line to atmosphere.

14. A railroad train having at least a locomotive and two freight cars therewithin, a first one of said freight cars forwardly located in said train and a second one of said freight cars rearwardly located in said train, each freight car having: (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body and (g) an air brake line running the length of said freight car:

(1) means on said first forward freight car coupled with each wheel thereon operative, upon derailment of one or more wheels of said car, to transmit a radio frequency signal and (2) means on said locomotive operative to receive the signal transmitted from the first forward freight car transmitter and signal means in said locomotive coupled therewith to alert the engineer of the train to the derailment.

15. A device as in claim 14 wherein, on the second, rearmost freight car, there is provided:

(1) a radio frequency signal receiver adapted to receive the signal transmitted from the first forward freight car transmitter, (2) a secondary air line connected to the air brake line of said rearmost car, (3) means containing a valve opening to atmosphere in said secondary air line, and (4) means coupled with said second freight car receiver operative to open said valve on receipt of said transmitter signal.

16. A railroad train having at least a locomotive and two freight cars therewithin, a first one of said cars forwardly located in said train and a second one of said cars rearwardly located in said train, each freight car having: (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body and (g) an air brake line running the length of said freight car:
- (1) means on said first forward freight car coupled with each wheel thereon operative, upon derailment of one or more wheels of said car, to transmit a radio frequency signal to said locomotive,
- (2) means on said locomotive operative to receive said radio frequency signal and actuate an alarm to inform the locomotive personnel as to the said occurring derailment,
- (3) means in said locomotive, operative, upon actuation by the locomotive personnel, to transmit a radio frequency signal to said second freight car,
- (4) means on said second, rearward freight car coupled with the air brake line of said second freight car operative, on receipt of said locomotive transmitter signal, to vent said air brake line to atmosphere.

17. Apparatus for detecting a derailment of one or more wheels of a railroad car in a train of such cars and for automatically initiating the braking of the derailed car and other cars in said train of cars, said train having an air brake system, such system including a longitudinally extending air brake pipe on each car for series connection to the airbrake pipes of other railway cars, each of said railroad cars having a body portion supported and carried by two railroad car multiple wheel carrying trucks, each of said trucks having a pair of opposed end side frames associated therewith, said frames coupling together two wheel axles, each axle having a wheel on each of the ends thereof, comprising
- (1) establishing an air conduit connection from the air brake pipe of a railroad car into the first pneumatic valve chamber of a first body comprising an air relief valve, said valve having said first pneumatic valve chamber therewithin, as well as a first hydraulic chamber with associated piston also therewithin,
- (2) said first body mounted on said railroad car body portion,
- (3) said first body first pneumatic valve chamber having an exhaust opening therefrom to atmosphere and control means for opening and closing said exhaust opening with respect to said pneumatic valve chamber,
- (4) establishing at least four separate sets of mechanical and hydraulic linkages, by way of four individual sensor cylinder and spring assemblies or second bodies, between four separate and longitudinally separated positions on the body of said railroad car body portion and each front and rear end of the opposed end side frames of a first one of the two railroad car wheel carrying trucks on said railroad car, each of said second bodies connected at an upper end thereof to said railroad car body portion and, at a lower end thereof, to one end of one of said first truck end side frames, each of said second bodies including a second hydraulic fluid chamber with associated piston therewithin,
- (5) establishing a first common hydraulic linkage of at least four hydraulic lines, each one of said lines connected to a second hydraulic fluid chamber in each of said four second bodies connected to the two side frames of said first truck,
- (6) connecting said first common hydraulic linkage, via a fifth hydraulic fluid line, to the first hydraulic fluid receiving piston chamber in said first body,
- (7) means coupled with the second hydraulic fluid chambers in each of said second bodies for drawing hydraulic fluid from the first hydraulic fluid receiving piston chamber through at least two of said five hydraulic lines to one of said second hydraulic fluid chambers in one of said second bodies when the railroad car wheel on said truck nearest each said second body connection thereto derails, and
- (8) means in said first body cooperating between said first pneumatic valve chamber control means and the piston of said first hydraulic fluid piston chamber operative to open the exhaust opening of said first body pneumatic valve chamber upon removal of hydraulic fluid from said first hydraulic fluid piston chamber to one of said second hydraulic fluid piston chambers and close said first valve on return of hydraulic fluid thereto.

18. Apparatus for detecting a derailment of one or more wheels of a railroad car in a train of such cars and for automatically initiating the braking of the derailed car and other cars in said train of cars, said train having an air brake system, such system including a longitudinally extending air brake pipe on each car for series connection to the air brake pipes of other railway cars, each of said railway cars having a body portion thereof supported and carried by two railroad car multiple wheel carrying trucks, said frames coupling together two wheel axles, each axle having a wheel on each of the ends thereof, comprising:
- (1) establishing an air conduit connection from the air brake pipe of a railroad car into the first pneumatic valve chamber of a first body comprising an air relief valve, said valve having said first pneumatic valve chamber therewithin, as well as a first hydraulic chamber with associated piston also therewithin,
- (2) said first body mounted on said railroad car body portion,
- (3) said first body first pneumatic valve chamber having an exhaust opening therefrom to atmosphere and control means for opening and closing said exhaust opening with respect to said pneumatic valve chamber,
- (4) establishing at least four separate sets of mechanical and hydraulic linkages, by way of four individual sensor cylinder and spring assemblies or second bodies, between four separate and longitudinally separated positions on the body of said railroad car body portion and each front and rear end of the opposed end side frames of a first one of the two railroad car wheel carrying trucks on said railroad car, each of said second bodies connected at an upper end thereof to said railroad car body portion and, at a lower end thereof, to one end of one of said first truck end side frames, each of said second bodies including a second hydraulic fluid chamber with associated piston therein,
- (5) establishing a first common hydraulic linkage of at least four hydraulic lines, each one of said lines connected to a second hydraulic fluid chamber in each of said four second bodies connected to the two side frames of said first truck,
- (6) connecting said first common hyraulic linkage, via a fifth hydraulic fluid line, to the first hydraulic fluid receiving piston chamber in said first body, (7) means coupled with the second hydraulic fluid chambers in each of said second bodies for forcing hydraulic fluid from the second hydraulic fluid chambers through at least two of said five hydraulic lines to and into said first hydraulic fluid receiving piston chamber in said first body when the railroad car wheel on said truck nearest each said second body connection thereto derails, and (8) mans in said first body cooperating between said first pneumatic valve chamber control means and the piston of said first hydraulic fluid piston chamber operative to open the exhaust opening of said first body pneumatic valve chamber upon receipt of hydraulic fluid into said first hydraulic fluid receiving piston chamber from one of said second hydraulic fluid piston chambers and close said valve on removal of hydraulic fluid therefrom.

19. Apparatus for detecting a derailment of one or more wheels of a railroad car in a train of such cars and for automatically initiating the braking of the derailed car and other cars in said train of cars, said train having an air brake system, such system including a longitudinally extending air brake pipe on each car for series connection to the air brake pipes of other railway cars, each of said railway cars having a body portion thereof supported and carried by two multiple wheel carrying trucks, said frames coupling together two wheel axles, each axle having a wheel on each of the ends thereof, comprising:

(1) establishing an air conduit connection from the air brake pipe of a railway car into the first pneumatic valve chamber of a first body comprising an air relief valve, said valve having said first pneumatic valve chamber therewithin, as well as a first hydraulic chamber with associated piston also therewithin, (2) said first body mounted on said railroad car body portion, (3) said first body first pneumatic valve chamber having an exhaust opening therefrom to atmosphere and control means for opening and closing said exhaust opening with respect to said pneumatic valve chamber, (4) establishing at least four separate sets or second bodies, between our separate and longitudinally separated positions on the body of said railroad car body portion and each front and rear end of the opposed end side frames of a first one of the two railroad car wheel carrying trucks on said railroad car, each of said second bodies connected at an upper end thereof to said railroad car body portion and, at a lower end thereof, to one end of one of said first truck end side frames, each of said second bodies including a second hydraulic fluid chamber with associated piston therewithin and comprising a sensor cylinder and spring assembly, (5) establishing a first common hydraulic linkage of at least four hydraulic lines, each one of said lines connected to a second hydraulic fluid chamber in each of said four second bodies connected to the two side frames of said first truck, (6) connecting said first common hydraulic linkage, via a fifth hydraulic fluid line, to the first hydraulic fluid receiving piston chamber in said first body, (7) means coupled with said second hydraulic fluid piston chambers in each of said second bodies for transferring hydraulic fluid through at least two of said five hydraulic lines between the first hydraulic fluid receiving piston chamber and one of said second hydraulic fluid chambers in one of said second bodies when the railroad car wheel on said truck nearest one of said second body connection thereto derails, and (8) means in said first body cooperating between said first pneumatic valve chamber control means and the piston of said first hydraulic fluid piston chamber operative to first open the exhaust opening of said first body pneumatic valve chamber upon a first transfer of hydraulic fluid in a first direction between said first and second hydraulic fluid piston chambers and close said first valve on opposite direction transfer of hydraulic fluid between said two chambers.

20. A railroad train having at least two freight cars therewithin, a first one of said cars forwardly located in said train and a second one of said cars rearwardly located in said train, each freight car having: (a) a car body and car body supporting frame, (b) sets of pairs of wheels mounted on paired axles, (c) each axle carrying two wheels near their respective ends thereof, (d) truck side frames connecting pairs of said axles on opposite ends thereof, (e) opposed ones of said side frames mounting bolsters therebetween, (f) said bolsters carrying said car frame and body and (g) an air brake line running the length of said car:

(1) first means on said first forward freight car coupled with each wheel thereon operative, upon derailment of one or more wheels of said car, to transmit a radio frequency signal from a radio transmitter on said first car to said second freight car and (2) second means on said second, rearward freight car coupled with the airbrake line of said second car operative, on receipt of said signal by radio receiver, to vent said airbrake line to atmosphere, and (3) said first means on said first forward freight car coupled with each wheel thereon including a permanent bar magnet positioned within a coil operable to move and oscillate a considerable distance within said coil upon derailment of one or more wheels of said car, thereby powering said radio frequency signal from said radio transmitter to said second freight car.

21. A railroad car having at least two freight cars therewithin, a first one of said cars forwardly located in said trains, each freight car having: (a) a car body and car body supporting frame, (b) sets of pairs of wheels mounted on paired axles, (c) each axle carrying two wheels near their respective ends thereof, (d) truck side frames connecting pairs of said axles on opposite ends thereof, (e) opposed ones of said side frames mounting bolsters therebetween, (f) said bolsters carrying said car frame and body and (g) an air brake line running the length of said car:

(1) first means on said first forward freight car coupled with each wheel thereon operative, upon derailment of one or more wheels of said car, to transmit a radio frequency signal through a radio transmitter on said first car and (2) second means on said locomotive operative to receive the signal transmitted from the first forward freight car transmitter including a radio receiver and signal means in said locomotive coupled therewith to alert the locomotive personnel of the train to the derailment, and (3) said first means on said first forward freight car coupled with each wheel thereon including a permanent bar magnet moving and oscillating a considerable distance in a coil whereby to power the transmission of said radio frequency signal from said radio transmitter to said locomotive.

22. A railroad train having at least two freight cars therewithin, a first one of said cars forwardly located in said train and a second one of said cars rearwardly located in said trains, each freight car having: (a) a car body and car body supporting frame, (b) sets of pairs of wheels mounted on paired axles, (c) each axle carrying two wheels near their respective ends thereof, (d) truck side frames connecting pairs of said axles on opposite ends thereof, (e) opposed ones of said side frames mounting bolsters therebetween, (f) said bolsters carrying said car frame and body and (g) an air brake line running the length of said car:
   (1) first means on said first forward freight car coupled with each wheel thereon operative, upon derailment of one or more wheels in said car, to transmit a radio frequency signal to said locomotive from a radio transmitter on said first car,
   (2) means on said locomotive, including a radio receiver, operative to receive said radio frequency signal and actuate an alarm to inform the locomotive personnel as to the said occurring derailment,
   (3) means in said locomotive including a radio transmitter, operative, upon actuation by the locomotive personnel, to transmit a radio frequency signal to said second freight car,
   (4) means including a radio receiver on said second, rearward freight car coupled with the air brake line of said second freight car operative, on receipt of said locomotive transmitter radio frequency signal, to vent said air brake line to atmosphere,
   (5) said means on said first forward freight car coupled with each wheel thereon including a permanent bar magnet within a coil operative to move and oscillate a considerable distance within said coil upon derailment of one or more wheels of said car, thus generating an electrical power pulse thereby to cause the transmitter on said first forward freight car to transmit said radio frequency signal to said locomotive.

23. A railroad train having at least one freight car and one caboose therewithin, the said freight car relatively fowardly located in said train and the caboose relatively rearwardly located in said train, said freight car and said caboose each having: (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween, (f) said bolsters carrying said car frame and body and (g) an air brake line running the substantial length of said train and including said car and caboose;
   (1) means on said forward freight car coupled with each wheel thereon operative, upon derailment of one or more wheels of said car, to transmit a radio frequency signal to a radio frequency receiver on said caboose and
   (2) means on said caboose coupled with the receiver and air brake line of said caboose operative, on receipt of said signal, to vent said air brake line to the atmosphere.

24. A railroad train as in claim 23 wherein said means on said freight car coupled with each wheel thereon includes a magnet within a coil operative to move within said coil upon derailment of one or more wheels of said car, thus generating an electrical power pulse thereby to cause the transmitter on said freight car to transmit said radio frequency signal to said caboose.

25. A railroad train having at least a locomotive and one car therewithin, said car rearwardly located in said train with respect to said locomotive, said car having (a) a car body and car body supporting frame, (b) sets of pairs of wheels mounted on paired axles, (c) each axle carrying two wheels near the respective ends thereof, (d) truck side frames connecting pairs of said axles on opposite ends thereof, (e) opposed ones of said side frames mounting bolsters therebetween (f) said bolsters carrying said car frame and body and (g) and air brake line running substantially the length of said car and train;
   (1) means on said freight car coupled with each wheel thereon operative, upon derailment of one or more wheels of said car, to transmit a radio frequency signal and
   (2) means on said locomotive operative to receive the signal transmitted from said car transmitter and signal means in said locomotive coupled therewith to alert the engineer of the train to the derailment.

26. A railroad train as in claim 25 wherein the means on said car coupled with each wheel thereon includes a permanent magnet within a coil operative to so move within said coil upon derailment of one or more wheels of said car, thereby to generate an electrical power pulse, whereby to cause the transmitter on said car to transmit the said radio frequency signal to said locomotive.

27. A railroad train as in claim 13 wherein the means on said first forward freight car coupled with each wheel thereon operative to transmit a radio frequency signal to said second freight car includes a permanent magnet within a coil operative to so move within said coil upon derailment of one or more wheels of said car, thus to generate an electrical power pulse thereby to cause the transmitter on said first foward freight car to transmit said radio frequency signal to said second freight car.

28. A railroad train as in claim 14 wherein the means on said first forward freight car operative upon derailment of one or more wheels of said car to transmit a radio frequency signal includes a permanent magnet within a coil operative to so move within said coil upon derailment of one or more wheels of such car thereby to generate an electrical power pulse, whereby to cause the transmitter to transmit said radio frequency signal to said locomotive.

* * * * *